US008515884B2

(12) United States Patent
Doctor et al.

(10) Patent No.: US 8,515,884 B2
(45) Date of Patent: Aug. 20, 2013

(54) NEURO TYPE-2 FUZZY BASED METHOD FOR DECISION MAKING

(75) Inventors: Faiyaz Doctor, Colchester (GB); Hani Hagras, Colchester (GB)

(73) Assignee: Sanctuary Personnel Limited, Ipswich, Suffolk (GB)

( * ) Notice: Subject to any disclaimer, the term of this patent is extended or adjusted under 35 U.S.C. 154(b) by 258 days.

(21) Appl. No.: 12/993,958

(22) PCT Filed: May 26, 2009

(86) PCT No.: PCT/GB2009/001303
§ 371 (c)(1),
(2), (4) Date: Nov. 22, 2010

(87) PCT Pub. No.: WO2009/141631
PCT Pub. Date: Nov. 26, 2009

(65) Prior Publication Data
US 2011/0071969 A1  Mar. 24, 2011

(30) Foreign Application Priority Data
May 23, 2008 (GB) .................................. 0809443.5

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl.
USPC ........................................................ 706/15

(58) Field of Classification Search
USPC ........................................................ 706/15
See application file for complete search history.

(56) References Cited

U.S. PATENT DOCUMENTS
5,701,400 A * 12/1997 Amado ............................ 706/45

2004/0098405 A1 *  5/2004  Zrubek et al. ............. 707/103 R
2004/0143559 A1 *  7/2004  Ayala ............................... 706/13

OTHER PUBLICATIONS

Applying Artificial Neural Network Models to Clinical Decision Making Rumi Kato Price, Washington University School of Medicine Edward L. Spitznagel, Washington University Thomas J. Downey and Donald J. Meyer, Panek. Inc. Nathan K. Risk, Washington University School of Medicine Omar G. El-Ghazzawy, Washington University.*
In the IEEE Transactions on Fuzzy Systems, vol. 15, No. 1, pp. 41-55, Feb. 2007 An Incremental Adaptive Life Long Learning Approach for Type-2 Fuzzy Embedded Agents in Ambient Intelligent Environments Faiyaz Doctor, Hani Hagras, Antonio Lopez, Victor Callaghan.*

* cited by examiner

Primary Examiner — Kakali Chaki
Assistant Examiner — Ababacar Seck
(74) Attorney, Agent, or Firm — Galgano & Associates, PLLC; Thomas M. Galgano; Jessica G. Bower

(57) ABSTRACT

According to a first aspect of the invention there is provided a method of decision-making comprising: a data input step to input data from a plurality of first data sources into a first data bank, analysing said input data by means of a first adaptive artificial neural network (ANN), the neural network including a plurality of layers having at least an input layer, one or more hidden layers and an output layer, each layer comprising a plurality of interconnected neurons, the number of hidden neurons utilized being adaptive, the ANN determining the most important input data and defining therefrom a second ANN, deriving from the second ANN a plurality of Type-1 fuzzy sets for each first data source representing the data source, combining the Type-1 fuzzy sets to create Footprint of Uncertainty (FOU) for type-2 fuzzy sets, modelling the group decision of the combined first data sources; inputting data from a second data source, and assigning an aggregate score thereto, comparing the assigned aggregate score with a fuzzy set representing the group decision, and producing a decision therefrom. A method employing a developed ANN as defined in Claim 1 and extracting data from said ANN, the data used to learn the parameters of a normal Fuzzy Logic System (FLS).

15 Claims, 14 Drawing Sheets

Figure 3 Diagram of Type-1 FLC.

Figure 4 a) Type-1 membership function. b) Type-2 membership function. c) Triangular secondary membership function plotted in thick line; interval secondary membership function plotted in dashed line.

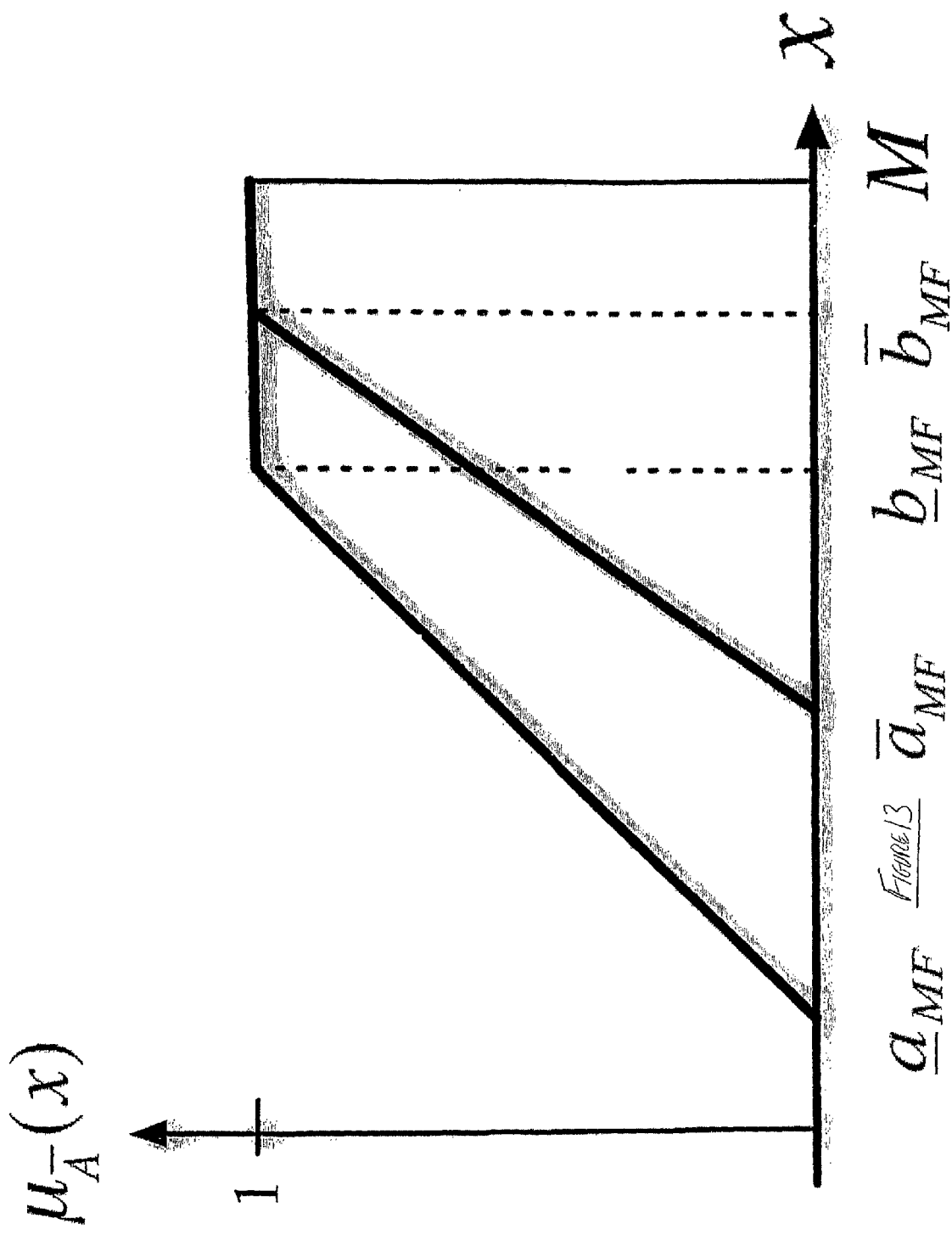

NEURO TYPE-2 FUZZY BASED METHOD FOR DECISION MAKING

FIELD OF THE INVENTION

The present invention pertains to methods and controllers for multi purpose intelligent data analysis and decision support systems in a variety of industrial and commercial applications which are characterised by large amounts of vague or complex information requiring analysis for making operational and cost effective decisions. The methods incorporate a group decision making process based on type-2 fuzzy systems.

BACKGROUND OF THE INVENTION

Most real world systems (such as national/global businesses, financial/stock markets, energy management systems, biological systems, pharmaceutical industries, internet traffic control, industrial control systems, etc.) are becoming complex with large numbers of inputs whose interactions, relations and effects on the system output are quite complex and are often unable to be fully understood and analysed by application users. In addition, recent advances in technology have resulted in the ability to easily acquire and store large amounts of numerical and linguistic data thus requiring the ability to handle quantitative and qualitative data sets of a given specific system. This has resulted in the need to provide novel systems that can handle large amounts of vague or complex data and make sense of them to accurately model the system and improve its performance. There is a need also to accurately identify important factors affecting the outputs as well as determining dependencies and relationships between the given system inputs and outputs in a uniquely intuitive and understandable way and thus creating accurate models (in an understandable linguistic format) of the system to be controlled. The developed controllers can then be employed to produce accurate predictions for the system outputs given the system inputs and justifying in an easy to understand user friendly human language why a given output was achieved. There is a need also for optimisation methods which can find the optimal system inputs to achieve a desired control output. There is a still further need for methods which allow group decision making to integrate data across various experts, locations, departments, sectors and systems to provide a best practice/benchmarking model and having decisions similar to those extracted from a panel of experts.

In financial stock market applications, there is a need to identify and understand from a huge number of factors, what primary factors will affect the stock prices for a given bank or company, and how they would effect an increase or decrease in the stock price. There is a need to provide such a model in an easy to understand linguistic model to enable the system to be transparent and fully understood to the user. For example the stock prices of a leading high street bank such as HSBC would be affected by specific primary factors that would determine how the price would move. Factors affecting the stock price could include: the stocks of related companies in the same sector, general economic data from countries the bank trades in, trading statements, competitor data, fixed and variable data, and other historical information. From this vast amount of data there is a need for a way of identifying the key primary factors affecting the stock price, show the relationships between these primary factors to determine how they affect the stock in order to accurately predict the future movement of the stock. Furthermore, there would be the need to provide efficient controllers that could predict the stock price given the current state. There is a need also to know what are the values of the controller inputs that will help to achieve a given increase in the stock prices (say 10%). In addition to data, the opinions and preference of human market commentators could also be of considerable value in taking into consideration the market trends, and trader opinions on the predicted movement of the stock price.

In the area of energy management. There is a need to identify the relations between the various factors (such as inside/outside temperature, activity, cloud cover, wind speed, number of occupants, etc) and energy consumption to create an accurate model of the system. This model could be used afterwards to develop a controller that can suggest optimised energy set points that will help to reduce the energy consumption in homes and offices. There is a need also to provide a method that will be able to indentify the optimum specific values of the given set points that will allow for example to achieve a 10% in energy savings while providing linguistic easy to understand justifications for the given decision which provide the user with a totally transparent system. The system will also be able to integrate linguistic advice from human experts on how to reduce energy.

The proposed system could also be employed in biological systems where better understanding is needed of which specific gene(s) in the enormous human genome or other factors are responsible for the prevalence of specific kind of disease and the importance/weights of the these given factors. Also rather than dealing with statistics which can be complicated to understand and analyse, the system can provide a linguistic and easy to understand representation that can indicate that if the given factors are high, low, etc, the possibility of the given disease cancer would be low. The system can also give a linguistic advice on how to reduce the possibility of the occurrence of a given disease. The system can also provide a best practice that can integrate information from various countries/experts to provide a best practice to reduce the possibility of the occurrence of a given disease and what are the preventative measures we can take to avoid this disease.

In another potential application, an automotive dealer business comprises of several hundred input factors such as part sales, number of repair bays and demographic data affecting its profits and operational costs in different areas. Here there is a need to accurately identify which key business indicators directly affect specific parts of the business and how, so that managers can make more informed decisions by predicting how these key indicators will cause an increase in profitability, decrease costs, etc. The system advises the user also on what the optimum values of the input parameters should be to achieve a given output (given increase in profit, given efficiency improvement, given cost reduction, etc.) while providing linguistic easy to understand justifications for the given decision which provide the user with a totally transparent system. The system also integrates the expert data from the various dealers (say 600 dealers as in the case of Peugeot) to provide a best practice (consensus modelling) for all the different dealers across the country.

Another possible application for our system is in local authorities and social welfare services such as The Integrated Children's System (ICS), which keep a huge amount of consistent data on child welfare case histories. Due to the vast amount of numerical and linguistic characteristics affecting the care of each child, it would be difficult for end users to identify trends and key risk factors that could lead to child abuse and neglect. For example in an inquiry into the death of a baby, it emerged that step fathers and frequent changes of social workers were factors that the investigation highlighted as high risks for potentially leading to cases of child abuse future. Currently there are no commercial systems which can analyse huge amounts of historical information on such case histories to identify these key potential risk factors. The ability for a system to both identify and show how these factors would be attributed to cases of child abuse, in a clear understandable way, would help social workers take early preventative action to safe guard children in care. In addition best practice amongst the social welfare experts across the country could be identified by taking into account opinions and recommendations of social works, to help improve the quality of service.

Another possible application is in the areas of Human Resources (HR) and recruitment sectors. In these sectors, the system aims to automatically characterise application or domain specific group decision models that can be used to classify, score and rank data and information specific to that domain. A decision is defined by a set of attributes that are either known or observed to best characterise that decision. Human experts and data sources can be used to elicit and extract domain specific characteristics pertaining to different domain and application decisions.

In many organisations, particularly those having a large number of members, certain decisions regarding the organisation require input from more than one individual. Each of these individuals, depending on experience, specialised knowledge base, as well as their personality will provide a different view on the decision. The consistency of these individuals also varies depending on the level of knowledge and expertise.

It remains therefore a problem to incorporate these views while determining the reliability of the information, into the final decision making methodology. One typical solution is to organise a meeting between the individuals at which it is hoped a consensus can be reached. Alternatively one person within the organisation may be tasked with making the final decision based on the input. In other applications where there are multiple different sources of information it is a problem to effectively analyse and model the data to account for the vagueness and uncertainties in the information and to incorporate these varied models into the final decision making methodology and derive effective and correct recommendations from the information to help end users make more informed decisions.

The above mentioned characteristics have not been achieved by the existing commercial systems. The invention therefore seeks to address the above deficiencies and provide an improved decision making process.

Firstly the most influential set of input features that affect the system outputs as well as the relative weighting of the different influential input features need to be identified. In addition, there is a need to provide in an easy to understand linguistic format the relationship between the system inputs and outputs. Various feature selection methods have been proposed to address the selection of the most relevant features for a classification task. In Cardie, "Proceedings of the Tenth International Conference on Machine Learning, 25-32", (1993)" and John et al. "Proceedings of International Conference on Machine Learning 121-9, (1994)". decision trees have been applied to find relevant features by keeping only those that appear in the decision tree. Principle Component Analysis is used to reduce complex data with a large number of attributes into lower dimensions to determine subtle features within the data. These approaches however do not provide a means showing the degree of influence and affect each input feature has on the output.

Feature weighting is an approach that seeks to estimate the relative importance of each feature (with respect to the classification task), and assign it a corresponding weight (Xinchuan Proceedings of the IEEE Joint Conference on Neural Networks, Vol 2, 1327-30, (2004)). It is suitable for tasks in which the relevance of the attributes needs to be determined. Several examples of feature weighting approaches can be found in the literature. Neural Networks can be used as a method for feature weighting where by the importance of a feature is extracted based on the strengths (weights) of related links in a trained neural network. Hence, Neural Networks unlike other feature selection methods not only extract the important and relevant input features, but Neural Networks can also identify the degree of influence and affect each input feature has on the output (i.e. the weight importance of the given important input features). In addition, Neural Networks have many advantages over other feature weighting mechanism as Neural Networks are characterised by being able to learn and adapt from training noisy data and they are capable of acting as universal appoximators. In addition neural networks, once trained, can provide a fast mapping from inputs to outputs. Neural networks therefore have the potential to better capture the most relevant features related to a classification task. However, Neural Networks suffer from the problem of being seen as a black box where it does not produce its learnt weights in a user friendly format that can be understood by the system user.

Another major problem addressed by the invention is the ability of the methods to generate a system model that can be easily read and analysed by the human user. Fuzzy Logic Systems (FLSs) have been used with great success to develop universal approximators that can handle the uncertainties and model the system performance using an easy to understand linguistic labels (such as Low, Medium, . . . ) and IF-Then rules. FLSs provide a framework for designing robust systems that are able to deliver a satisfactory performance when contending with the uncertainty, noise and imprecision attributed to real world applications. FLSs also allow information to be represented in a transparent and flexible human readable form.

However, there is a need to develop learning mechanisms that can learn and adapt the fuzzy systems parameters to the changing environments and system conditions. In addition, for applications to which the invention can be applied, there is an advantage for the learning mechanism to be online, fast and one pass learning method rather than an iterative learning method.

When dealing with the process of human decision making in real world applications the classification and aggregation of knowledge and information leads to uncertainties due to different opinions and preferences of experts, the varying sources of information and the vagueness and imprecision in the data. It is therefore impossible to quantify group decision-making using traditional mathematical models. For example the task of formulating a new person specification (job requirement) for a given job role is the responsibility of the organisation's Human Resources (HR) manager. This usually involves a group decision-making process to derive a collective opinion from a selection panel of individuals who have expertise related to the occupation domain associated with the job role.

Each expert's opinions and preferences for the job requirements can vary based on their roles in the organisation, knowledge and experience pertaining to the occupation domain. Each expert can also consider certain characteristics more or less important than others. The variations in the opinions of experts cause high level of uncertainties when specifying the job requirements. Each expert's opinions and preferences for the job requirements can vary based on their roles in the organisation, knowledge and experience pertaining to the occupation domain.

Each expert can also consider certain characteristics more or less important than others and it is not always clear without observing the expert's decision making behaviour which characteristics most influence a ranking decision. Due to the varying knowledge and experiences of different experts, not all experts will be consistent in their opinions and in applying their preferences for consistently ranking different applicants with similar abilities in the same way. It is therefore important to identify and give a higher weighting to the opinions of more reliable and experienced experts over those who are less consistent in their decision making behaviour. The variations in the opinions and consistencies of different experts cause high degrees of uncertainties. Conventional attempts at addressing these uncertainties are through meetings and discussion sessions, which can be both time consuming and difficult to coordinate for different departments and divisions of the organisation. The varying opinions of the experts can make it difficult to achieve an agreement or consensus among the group. In addition, the final decision may not always reflect the opinions of all the experts in an objective way.

The difficulty increases for big multinational organisations where distributed experts need to collaborate to develop an international advert for a given job role. Thus the process of human decision making is naturally uncertain due to the inherent subjectivity and vagueness in the articulation and aggregation of human opinions and preferences. Due to the unsuitability of mathematical models to handle these sources of uncertainty and due the need to employ human understandable systems, FLSs have been used in the area of group decision making.

There are several approaches within the literature that use fuzzy logic for modelling group decision making process. These models deal with decision situations in which a set of experts have to choose the best alternative or alternatives from a feasible set of alternatives. The different processes which have been focused on are: the consensus process and selection process Alonso et al. Proceedings of the IEEE International Conference on Fuzzy Systems, 1818-23, (2007). The former consists of obtaining the highest consensus (agreement) among experts to obtain a state where the opinions of the different experts are as close as possible to one another. The latter process consists of obtaining the final solution to the problem from the opinions expressed by the experts in the consensus process. Recent work presented an automated system that handles incomplete and imprecise knowledge about experts' preferences using incomplete fuzzy preference relations. The consensus producing mechanism is an iterative process with several consensus rounds, in which the experts accept to change their preferences following advice generated by the system in order to obtain a solution with a high degree of consensus between the experts. In these systems there is also much focus throughout the process on maintaining consistency of information and avoiding contradiction between the opinions and preferences of different experts.

The approaches outlined above are based on type-1 fuzzy logic approaches for achieving a group consensus on a set of known solutions. However, these type-1 approaches do not aim to model and handle the high levels of uncertainties involved within the group decision process.

Type-2 fuzzy systems could be used to handle the uncertainties in the group decision making process as they can model the uncertainties between expert preferences using type-2 fuzzy sets. A type-2 fuzzy set is characterized by a fuzzy Membership Function (MF), i.e. the membership value (or membership grade) for each element of this set is a fuzzy set in [0,1], unlike a type-1 fuzzy set where the membership grade is a crisp number in [0,1]. The MFs of type-2 fuzzy sets are three dimensional and include a Footprint Of Uncertainty (FOU). Hence, type-2 fuzzy sets provide additional degrees of freedom that can make it possible to model the group uncertainties between the varying opinions and preferences of experts.

Current existing and commercial systems mostly rely on mathematical/statistical modelling or expert systems. Traditional expert systems are static models which do not reflect real data and provide acceptable results or explanations for the aforementioned domains. The current mathematical modelling techniques lack visibility and transparency because they cannot be easily understood and analysed by the end user. There is therefore a need to produce intelligent systems that can provide in an easy to interpret linguistic format, a more intuitive way of identifying the relations and interactions between the various inputs and the system outputs.

Most predictive analysis systems are simplistic in the way in which they only predict how specific outcomes such as production costs are affected by certain changes in key business indicators such as labour and parts. They do not however provide a means of accurately determining what exact optimum increases or reductions in these parameters will be needed to achieve a 30% reduction in production costs. There is therefore a need also to supply an intelligent decision support mechanism that is able to advise the user on how to maximise performance, improve efficiency or reduce costs by a desired amount, giving accurate and exact explanations of how they can achieve this and justify their decisions.

The predictive models generated from other commercial systems are not flexible enough to handle vague and uncertain information that exist in real world applications, and are unable to adapt to changing circumstances.

Even if a system includes neural networks or fuzzy systems, the system cannot process data and produce an interpretation of the system operation as well as advising on what will be the optimum system input parameters to realise a given output value and handle the uncertainties involved with the group decision processes.

Finally there is a need for a system that can integrate various different data sources and suggestions related to different sites and human expert recommendations together within a single framework. This can provide a unique value in being able to identity best practices across divisions or branches within large organisations and determine benchmarks for improving efficiency and profitability.

In the following subsection, background material is presented concerning some of the computational intelligence concepts employed throughout the invention description.

The invention comprises novel computational intelligence mechanisms and controllers that can analyse large amounts of vague or complex numerical and linguistic data and thus allowing the to ability to handle quantitative and qualitative data to accurately identify important factors affecting the outputs as well as determining dependencies and relationships between the given system inputs and outputs in a uniquely intuitive and understandable way and thus creating accurate model (in an understandable linguistic format) of the system to be controlled. The invented controllers can then produce accurate predictions for the system outputs given the system inputs and justifying in an easy to understand user friendly human language why a given output was achieved. The invention has also optimisation methods which can find the optimal system inputs to achieve a desired control output. In addition, the invention has methods which allows group decision making which is based on type-2 fuzzy systems to integrate data across various experts, dealers and locations to provide a best practice/benchmarking model and having decisions similar to those extracted from a panel of experts.

SUMMARY OF THE INVENTION

According to a first aspect of the invention there is provided a method of decision-making comprising: a data input step to input data from a plurality of first data sources into a first data bank, analysing said input data by means of a first adaptive artificial neural network (ANN), the neural network including a plurality of layers having at least an input layer, one or more hidden layers and an output layer, each layer comprising a plurality of interconnected neurons, the number of hidden neurons utilised being adaptive, the ANN determining the most important input data and defining therefrom a second ANN, deriving from the second ANN a plurality of Type-1 fuzzy sets for each first data source representing the data source, combining the Type-1 fuzzy sets to create Footprint of Uncertainty (FOU) for type-2 fuzzy sets, modelling the group decision of the combined first data sources; inputting data from a second data source, and assigning an aggregate score thereto, comparing the assigned aggregate score with a fuzzy set representing the group decision, and producing a decision therefrom.

Advantageously, the method includes the step determining the internal consistency of data from a first data source. This enables the reliability of the data source to be checked.

Conveniently, the consistency of data from a first data source is compared with the consistencies of other first data sources. Data sources can therefore be assessed in light of similar data sources. This is useful for example, where data sources are inherently ambiguous and where absolute measures of consistency might lead to too much data being rejected. Further conveniently, a weighting value is assigned to the consistency.

Preferably, a first data source having a weighting value outside a preset range is discounted from further calculations. Data which is too unreliable can be removed from consideration.

Conveniently, further data from a first source is input, the consistency value for said source being recalculated. The methodology effectively allows a system incorporating the method to learn from new data and also allows reintroduction of data from source where the quality of the data has improved. Further conveniently, should the recalculated consistency weighting value lie inside the preset range, the first data source is incorporated in further calculations.

Preferably, the first data source is a human expert in the field of the particular decision.

Conveniently the method includes the step of identifying the dominant factors affecting an outcome, assigning a weighting function to said dominant factors such that the decision produced is based on the dominant factors to a greater degree than those not so identified. Better quality sources of data which can be relied upon with more certainty, can therefore be assigned a quantitatively greater role in decision making.

Optionally those factors having a weighting value below a outside preset value range are discounted from the decision making.

Conveniently the method allows a desired decision to be entered, the method then determining required input data to achieve said decision. The method enables a user to input a desired decision and obtain input values which enable this decision to be achieved.

Type-1 Fuzzy Sets and Systems

Fuzzy Logic extends on conventionally crisp set theory in the following way: a crisp set A in a universe of discourse U can be defined by identifying the elements $x \subset A$. One way this can be done is by specifying a condition or conditions for which $x \subset A$ (J M Mendel: "Uncertain Rule Based Fuzzy-Logic Systems: Introductions and New Directions" Prentice Hall Inc. 2001) thus A can be defined as:

$$A = \{x | x \text{ meets some condition(s)}\} \quad (1)$$

This can also be represented by introducing a zero-one Membership Function (MF) (also called a characteristic function, discrimination function or indicator function) for A, denoted $\mu_A(x)$ such that:

$$A \Rightarrow \mu_A(x) = \begin{cases} 1 & \text{if } x \in A \\ 0 & \text{if } x \notin A \end{cases} \quad (2)$$

A fuzzy set is a generalisation of a crisp set. It is identified on the universe of discourse U and is characterised by a MF $\mu_F(x)$ that takes on the values in the interval [0, 1] see FIG. 1. The MF provides a measure of the degree of similarity of an element in U to the fuzzy set F, and F can also be treated as the subset of U. An element x can therefore have both complete and partial membership of a fuzzy set and can therefore also reside in more than one fuzzy set to different degrees of similarity.

A fuzzy set F in U may be represented as a set of ordered pairs of a generic element x and its grade of MF $\mu_F(x)$ [Mendel 2001], i.e., $$F = \{(x, \mu_F(x)) | x \in U\} \quad (3)$$

Therefore the MF for the fuzzy set F is represented as:

$$(x, \mu_F(x)) \forall x \in U \quad (4)$$

where $\mu_F(x)$ denotes the grade of the MF. It is however also common practice to represent $\mu_F(x)$ as the MF. If U is continuous (e.g. the real numbers), F is also commonly written as:

$$F = \int_U \mu_F(x)/x \quad (5)$$

where the integration sign in Equation (5) denotes the collection of all points $x \in U$ with the associated MF $\mu_F(x)$.

Humans generally tend to use words and sentences to describe the complex world in a less specific way than using numbers and mathematics. Linguistic variables and labels representing words are therefore used to describe information in fuzzy logic and can be associated with fuzzy sets. In Zadeh: "The Concept of a Linguistic Variable and its applications to Approximate Reasoning" Journal of Information Sciences 8, 199-249, (1975), it is stated that: 'In retreating from precision in the face of overpowering complexity, it is natural to explore the use of what might be called linguistic variables, that is, variables whose values are not numbers but words or sentences in a natural or artificial language. The motivation for the use of words or sentences rather than numbers is that linguistic characterizations are, in general, less specific than numerical ones.'

Computing with words is necessary when the information being represented is too imprecise to justify the use of numbers. This tolerance for imprecision can be exploited to achieve tractable, robust and low solution cost system. Fuzzy logic thus offers a methodology for computing with words where these words can have fuzzy denotations. A key aspect of fuzzy logic is that it involves a fusion of natural language and computation with fuzzy variables.

A linguistic variable for external temperature whose domain covers some range of values can be therefore defined as u. The numerical (measured) values of u are denoted x, where x ∈ U and x and u can be interchangeably used. The linguistic variable u can then be further decomposed into a set of terms Tr(u) that represent the fuzzy granularisation of the linguistic variable into fuzzy sets that are defined over the domain of the variable.

Fuzzy granularisation is different from numerical measurements which generally tend to be precise using crisp numbers which are quantified into crisp sets. Fuzzy granules are fuzzy numbers that can be described by 'words' in fuzzy logic and represent the imprecise perceptions about the meaning of information and how it is grouped together. These granules represent clumps of similar objects that are grouped into imprecise clusters in which the transition from membership to non-membership is gradual rather than abrupt. In this way fuzzy granularisation can also be seen as a form of fuzzy data compression which can be obtained either manually using expert knowledge or automatically using an intelligent learning approach. Consequently, the linguistic variable u representing external temperature can be decomposed into a set of terms or labels such as 'very low, 'low', 'medium', 'high' and 'very high'. These linguistic labels represent the fuzzy numbers that can be perceptually and semantically grouped together to represent the fuzzy granules. Each label is thus represented by a fuzzy set which is represented mathematically by a specific type of MF of our choosing. FIG. 2 shows examples of Gaussian MFs representing the fuzzy sets for linguistic labels defined over the domain of the variable external temperature.

The number of defined MFs over a linguistic variable can vary depending on the resolution of the system. Greater resolution is achieved by using more MFs; however this is at the cost of greater computational complexity as this will increase the number of MF parameters, and the larger number of fuzzy sets used to represent the input variables of the fuzzy controller the more possible rules the system will have. One of the strengths of fuzzy logic however is that the MFs can be defined to overlap enabling decisions to be distributed over more than one input class. This makes FLSs more robust and able to handle the dynamics of real world settings.

Fuzzy Logic Controllers (FLC) have been successfully deployed in a variety of engineering, control, financial and business information applications. FLCs also provide an appropriate framework for representing the information in a human readable form, which is one of the requirements of this system.

A traditional type-1 FLC can be extended to a type-2 FLC which will be described in the following section. Thus when referring to traditional FLCs they are also normally referred to as type-1 FLCs. Type-1 FLCs contain four main components which are the fuzzifier, rule base, fuzzy inference engine and defuzzifier as shown in FIG. 3.

The type-1 FLC works as follows: The fuzzifier is responsible for mapping the crisp sensory inputs into input fuzzy sets which in turn activate the rules. The fuzzy inference engine then maps input fuzzy sets into output fuzzy sets and handles the way in which rules are activated and combined. Rules are activated or fired if there is a non-zero degree of similarity between the system inputs and the antecedents of the rules. The results of such rule firing are outputs that have a non-zero degree of similarity to the rule's consequents.

The outputs of the fuzzy inference engine are fuzzy sets that specify a possibility distribution of the control actions. These fuzzy outputs need to be converted to nonfuzzy (crisp) control values that can then be used to operate the various actuator devices in the environment. The defuzzifier select representative values from the fuzzy outputs which were inferred from the fuzzy control algorithm used in the inferential process. They then convert these back to the crisp control values.

The type-1 FLC can be completely described using a mathematical formula that maps a crisp input vector x into a crisp output y=$f$(x). Such a formula can be obtained by following the signal x through the fuzzifier, where it is converted into the fuzzy set $A_x$, into the inference block where it is converted into the fuzzy set $B_c^l$(l=1, ..., M) and possibly $B_c$, and finally into the defuzzifier, where it is converted into $f$(x). One of the widely used type-1 FLCs employ singleton fuzzification, max-product composition and height defuzzification [Mendel 2001]. This formula is as follows:

$$y(x)_c = f_{sys}(x)_c = \frac{\sum_{l=1}^{M} \bar{y}_c^l \prod_{s=1}^{n} \mu_{F_s^l}(x_s)}{\sum_{l=1}^{M} \prod_{s=1}^{n} \mu_{F_s^l}(x_s)} \qquad (6)$$

Where M is the total number of rules in the rule base, $\bar{y}_c^l$ is the point having the maximum membership in the $l^{th}$ rule output fuzzy set $B_c^l$, $\prod_{s=1}^{n} \mu_{F_s^l}(x_s)$ is the product of the MFs of each rule's inputs and n is the number of inputs. For multiple outputs the Equation in (6) is repeated for each output variable. Similar formulas describing different type-1 FLCs can also be used with appropriate modification to the terms depending on specific choices for fuzzifier, membership functions, composition, implication, t-norm and defuzzifier.

Type-2 Fuzzy Sets and Systems

Type-2 fuzzy sets are able to model the numerical and linguistic uncertainties because their MFs are themselves fuzzy. One can imagine blurring the type-1 MF depicted in FIG. 4a by shifting the points on the triangle either to the left or to the right and not necessarily by equal amounts as in FIG. 4b. Therefore at a specific value of x, say x', there is no longer a single value for the MF (u'); instead, the MF takes on values wherever the vertical line intersects the blurred area shaded in grey. Those values need not all be weighted the same; hence, an amplitude distribution can be assigned to all of those points. Doing this for all x ∈ X, creates a three-dimensional MF which is a type-2 MF that characterises a type-2 fuzzy set [Mendel 2001].

Formally a type-2 fuzzy set $\tilde{A}$ is characterised by a type-2 MF $\mu_{\tilde{A}}(x,u)$ where x ∈ X and u ∈ $J_x \subseteq [0,1]$, i.e., $$\tilde{A} = \{((x,u), \mu_{\tilde{A}}(x,u)) | \forall x \in X, \forall u \in J_x \subseteq [0,1]\} \qquad (7)$$

in which $0 \leq \mu_{\tilde{A}}(x,u) \leq 1$. $\tilde{A}$ can also be expressed as follows:

$$\tilde{A} = \int_{x \in X} \int_{u \in J_x} \mu_{\tilde{A}}(x,u)/(x,u) \, J_x \subseteq [0,1] \qquad (8)$$

where $\iint$ denotes union over all admissible x and u. At each value of x say x=x', the 2-D plane whose axis are u and $\mu_{\tilde{A}}(x',u)$ is called a vertical slice of $\mu_{\tilde{A}}(x,u)$. A secondary membership function is a vertical slice of $\mu_{\tilde{A}}(x,u)$. It is $\mu_{\tilde{A}}(x=x',u)$ for x' ∈ X and ∀u ∈ $J_{x'} \subseteq [0,1]$, i.e.

$$\mu_{\tilde{A}}(x=x',u) \equiv \mu_{\tilde{A}}(x') = \int_{u \in J_{x'}} f_{x'}(u)/(u) \, J_{x'} \subseteq [0,1] \qquad (9)$$

in which $0 \leq f_{x'}(u) \leq 1$. Due to ∀x'∈ X, the prime notation on $\mu_{\tilde{A}}(x')$ is dropped and $\mu_{\tilde{A}}(x)$ is referred to as a secondary MF. The name that is used to describe the entire type-2 MF is associated with the name of the secondary MFs; so, for example if the secondary MF is triangular (as shown in FIG. 4c) then one can refer to $\mu_{\tilde{A}}(x,u)$ as a triangular type-2 MF.

Based on the concept of secondary sets, type-2 fuzzy sets can be written as the union of all secondary sets as follows:

$$\tilde{A} \int_{x \in X} \mu_{\tilde{A}}(x)/x = \int_{x \in X} [\int_{u \in J_x} f_x(u)/u]/x \quad J_x \subseteq [0,1] \quad (10)$$

The domain of secondary MFs is called primary membership of x, and in Equation (10), $J_x$ is the primary MF of x, where $J_x \subseteq [0,1]$ for $\forall x \in X$.

The uncertainties in the primary MF of $\tilde{A}$ are encapsulated within the bounded region termed as the Footprint of Uncertainty (FOU), which is shown as the grey region in FIG. 4b. The FOU is the union of all primary memberships, i.e., $$FOU(\tilde{A}) = \bigcup_{x \in X} J_x \quad (11)$$

The FOU focuses our attention on the uncertainties inherent in a specific type-2 MF whose shape is a direct consequence of the nature of these uncertainties. The FOU also provides a very convenient verbal description of the entire domain of support for all the secondary grades of a type-2 membership function. The FOU implies that there is a distribution that sits on top of it—the new third dimension of type-2 fuzzy sets. The form which this distribution takes depends on the specific choice made for the secondary grades. When they are all equal to one, the resulting type-2 fuzzy sets are called interval type-2 fuzzy sets. Establishing an appropriate FOU is analogous to establishing a probability density function (pdf) in a probabilistic uncertainty situation. The larger the FOU the more uncertainty there is. When the FOU collapses, then its associated type-2 fuzzy set collapses to a type-1 fuzzy set, in much the same way that a pdf collapses to a point when randomness disappears.

A type-2 fuzzy set can be thought of as a large collection of embedded type-1 sets each having a weight associated with it. For the continuous universes of discourse X and U, an embedded type-2 set $\tilde{A}_e$ is defined as follows:

$$\tilde{A}_e = \int_{x \in X} f_x(u)/u]/x \quad u \in J_x \subseteq [0, 1] \quad (12)$$

$\tilde{A}_e$ is embedded in $\tilde{A}$ and there are an uncountable number of embedded type-2 sets in $\tilde{A}$. For the continuous universes of discourse X and U, an embedded type-1 set $A_e$ is the union of all the primary memberships of set $\tilde{A}_e$ in Equation (12) and there is an uncountable number of $A_e$.

Interval Type-2 Fuzzy Sets

In Equation (10) when $f_x(u)=1$, $\forall u \in J_x \subseteq [0,1]$, then the secondary MFs are interval sets, and if this is true for $\forall x \in X$, we have the case of an interval type-2 MF which characterises the interval type-2 fuzzy sets. Interval secondary MFs reflect a uniform uncertainty at the primary memberships of x. Interval type-2 sets are very useful when there is no knowledge about the secondary membership functions. The membership grades of the interval type-2 fuzzy sets are called "interval type-1 fuzzy sets". Since all the memberships in an interval type-1 set are unity, in the sequel, an interval type-1 set is represented just by its domain interval, which can be represented by its left and right end points as [l,r]. The two end points are associated with two type-1 MFs that are referred to as the upper and lower MFs.

The upper and lower MFs are two type-1 MFs which form the upper and lower bounds for the FOU of the type-2 fuzzy set $\tilde{A}$. FIG. 4c illustrates the interval secondary MF (plotted with the dashed line) at x'. Formally the upper and lower MFs of a fuzzy set $\tilde{A}$ are denoted by $\overline{\mu}_{\tilde{A}}(x)$, $\forall x \in X$ and $\underline{\mu}_{\tilde{A}}(x)$, $\forall x \in X$ respectively. Equation (10) can be re-expressed to represent the interval type-2 fuzzy set $\tilde{A}$ in terms of upper and lower MFs as follows:

$$\tilde{A} = \int_{x \in X} \left[ \int_{u \in [\underline{\mu}_{\tilde{A}}(x), \overline{\mu}_{\tilde{A}}(x)]} 1/u \right] / x \quad (13)$$

A type-2 FLC is depicted in FIG. 5 and it contains five components, which are comprised of the fuzzifier, rule base, fuzzy inference engine, type-reducer and defuzzifier. In developing the type-2 FLC both the inputs and outputs will be represented by type-2 sets to handle the uncertainties associated with the input and output variables. Interval type-2 fuzzy sets will be used to represent the input and output variables as they are simple to use and useful when no other knowledge about secondary memberships is available, as they distribute the uncertainty evenly among all admissible primary memberships. At present it is very difficult to justify the use of other kinds of type-2 fuzzy sets, e.g., as there is no best choice for type-1 fuzzy sets, so to compound this non-uniqueness by leaving the choice of the secondary membership functions arbitrarily is hardly justifiable. Furthermore, the general type-2 FLC is computationally intensive and the computation simplifies a lot when using interval type-2 FLC (using interval type-2 fuzzy sets) which will enable us to design the type-2 FLC that operates in real time and is computationally less intensive and better suited to embedded computers.

The type-2 FLC works as follows, the crisp inputs from the input sensors are first fuzzified into, in general, input type-2 fuzzy sets (however, only fuzzification is considered here) which then activate the inference engine and the rule base to produce output type-2 fuzzy sets. The type-2 fuzzy outputs of the inference engine are then processed by the type-reducer which combines the output sets and then performs a centroid calculation, which leads to type-1 fuzzy sets called the type-reduced sets. The defuzzifier can then defuzzify the type-reduced type-1 fuzzy outputs to produce crisp outputs to be fed to the actuators. Like the type-1 FLC, the type-2 FLC can be viewed as a mapping from crisp inputs to crisp outputs and can be expressed quantitatively as $y=f(x)$. However, a type-2 FLC has more design degrees of freedom than the type-1 FLC, because its type-2 fuzzy sets are described by more parameters than are type-1 fuzzy sets.

As the type-reduced set of a type-2 FLC is the centroid of a type-2 fuzzy output set for the FLC; consequently, each element of the type-reduced set is the centroid of some type-1 set embedded in the output set of the type-2 FLC. Each of these embedded sets can be thought of as an output set of some type-1 FLC and, correspondingly, the type-2 FLC can be thought of as a collection of many different type-1 FLCs. Each of these type-1 FLCs is embedded in the type-2 FLC, so the type-reduced set is a collection of the outputs of all the type-1 FLCs embedded in the type-2 FLC. If we think of a type-2 FLC as a "perturbed" version of a type-1 FLC, due to uncertainties in the membership functions, the type-reduced set of the type-2 FLC can then be thought of as representing the uncertainty in the crisp output due to uncertainties in the MFs. The crisp outputs to the agent actuators can be obtained by aggregating the outputs of all the embedded type-1 FLCs. In this way, the type-2 FLC has the potential to outperform the type-1 FLC as it is dealing with the uncertainty thorough different embedded type-1 FLCs.

Neural networks

Artificial Neural Networks (ANNs) are an information processing paradigm that is inspired by the way in which biological nervous systems such as the brain process information. The key element of this paradigm is the novel structure of the information processing system. This system is composed of large number of highly interconnected processing elements called neurons, which work in unison to solve specific problems.

In a similar way to people, ANNs can also learn by example. An ANN is configured for a specific application, such as pattern recognition or data classification, prediction and forecasting through a learning process. Using a supervised training algorithm such as backpropagation the network can automatically be trained to learn the structure or classification of the data. This learning process adjusts to the synaptic connections or weights that exist between the neurons. Given a set of training data (input and output pairs) (x,y), where x ∈ X, and y ∈ Y; the aim is to find a function $f:X \rightarrow Y$ in the allowed class of functions that approximates the mapping between the inputs and outputs implied by the data. It has been shown that ANNs are universal approximators as they have the ability to approximate any function to an arbitrary degree of accuracy.

FIG. 6 shows the topology of a multilayer feed forward ANN with an input layer, single hidden layer and an output layer, however the topology of the network can vary in terms of the number of inputs and outputs and the number of hidden layers. ANNs are 'black box' systems because it is very difficult to understand how the mappings between a set of inputs and outputs, or the classification of output decisions are reached. The internal state of the trained artificial neural network is represented by a multidimensional matrix of real numbers that represent the learnt weight values or synaptic connections that exist between the neurons. For example in a feedforward multi layer preceptron ANN, when the network receives inputs they are multiplied by the learnt weights associated with the connections between the neurons in each layer. These weights correspond to synaptic strength of the neurons and encode the input output mappings that network has modelled from the training data. Each neuron also has an activation function that receives the summation of the products of the weights and their inputs. The activation signal is passed through an activation function to produce the output of the neuron. An activation signal for the given set of inputs is propagated over the activated neurons in each layer of the network to produce the final output of the network. It is therefore very difficult for an end user to interpret the learnt weights and the activation of the networks neurons into understandable descriptions explaining the relationship between a set of data inputs and the output classifications or decisions that was produced.

The invention as set out below provides a method of automating the process of analysis and classification of different sources of information and expert opinions and preferences using a type-2 neuro-fuzzy approach incorporating neural networks and type-2 fuzzy systems. The system creates decision models from the different data sources and expert opinions that capture the relationships in the data and/or collective views from a group of experts in a consistent and objective way by modelling the uncertainties between the experts' preferences and/or different data sources using type-1 and type-2 fuzzy sets. A scoring method is proposed that can score and rank information based on how well they match the different data and expert decision models The scores are mapped to the type-2 fuzzy sets to determine a collective group based decision on the information. The decision models are adaptive to incorporating new data and expert opinions.

BRIEF DESCRIPTION OF THE DRAWINGS

FIG. 13 illustrates right shoulder upper and lower MFs.

DETAILED DESCRIPTION OF THE INVENTION

Figure 1:
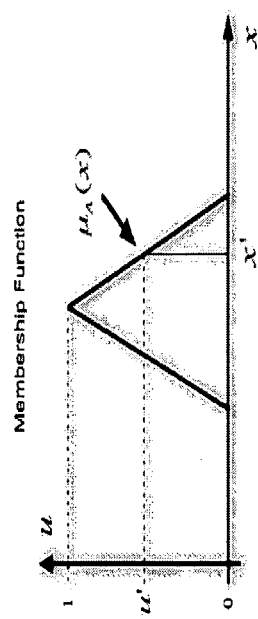
FIG. 1 illustrates a fuzzy set.
Figure 2:
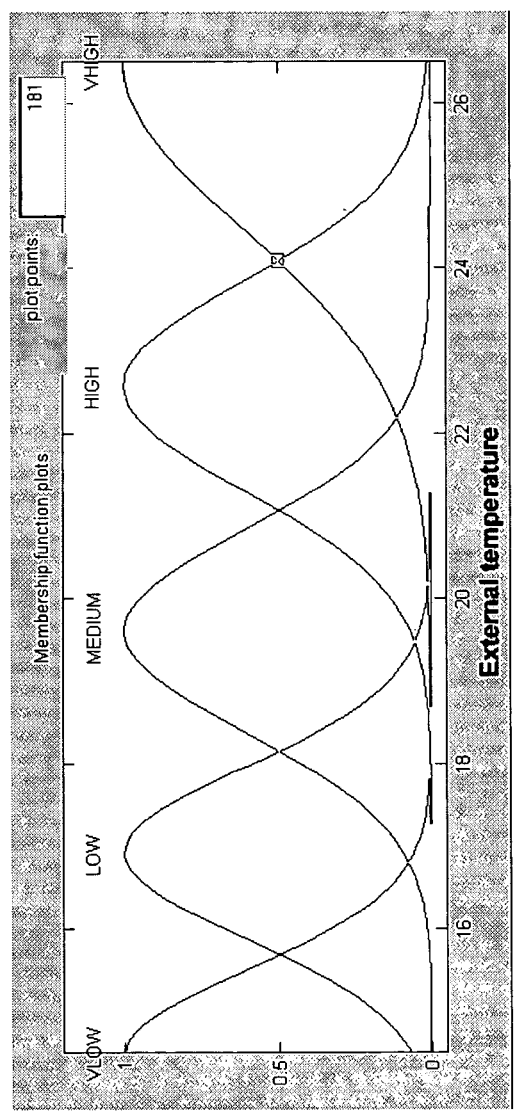
FIG. 2 illustrates examples of Gaussian MFs representing the fuzzy sets for linguistic labels defined over the domain of the variable external temperature.
Figure 3:
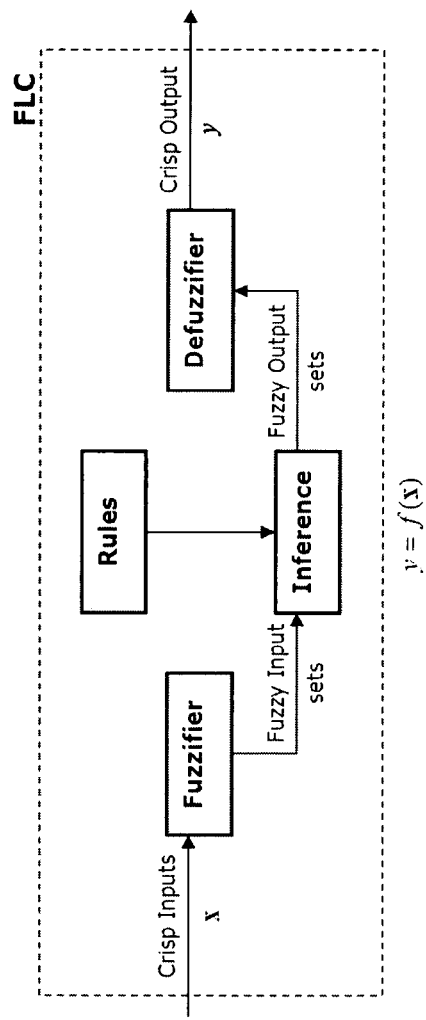
FIG. 3 is a flow diagram of Type-1 FLC.
Figure 4:
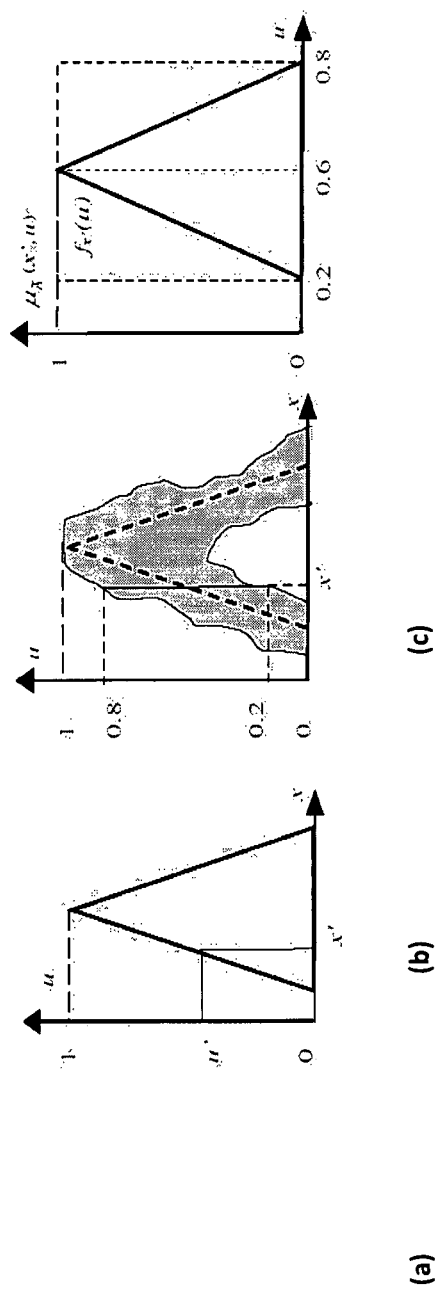
FIG. 4a illustrates a Type-1 membership function.
FIG. 4b illustrates a Type-2 membership function.
FIG. 4c illustrates triangular secondary membership function plotted in thick line and interval secondary membership function plotted in dashed line.
Figure 5:
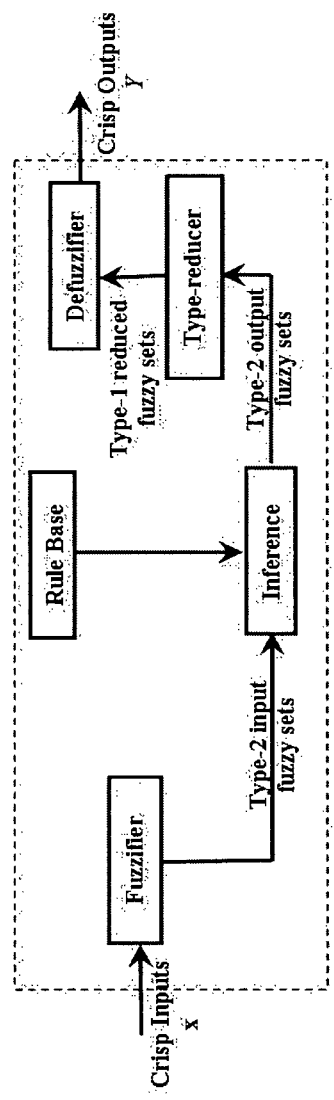
FIG. 5 is a flow diagram illustrating a type-2 FLC.
Figure 6:
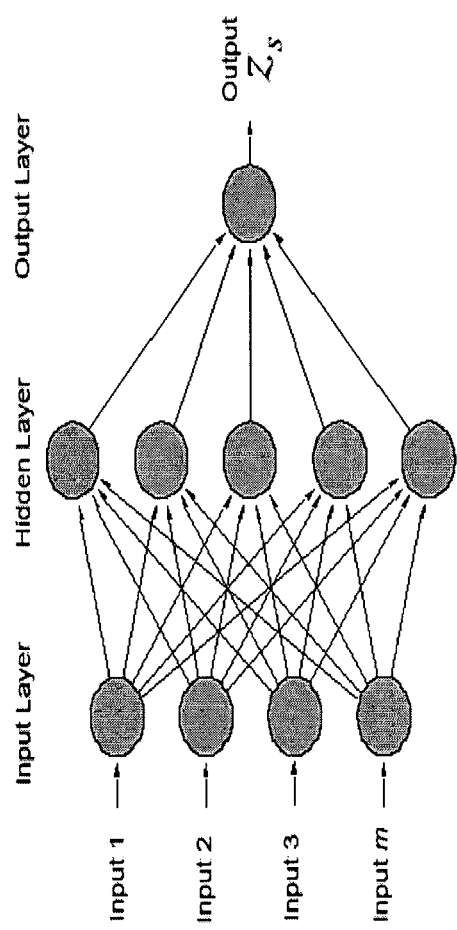
FIG. 6 is a flow diagram illustrating the topology of a multilayer feed forward ANN with an input layer, single hidden layer and an output layer.
Figure 7:
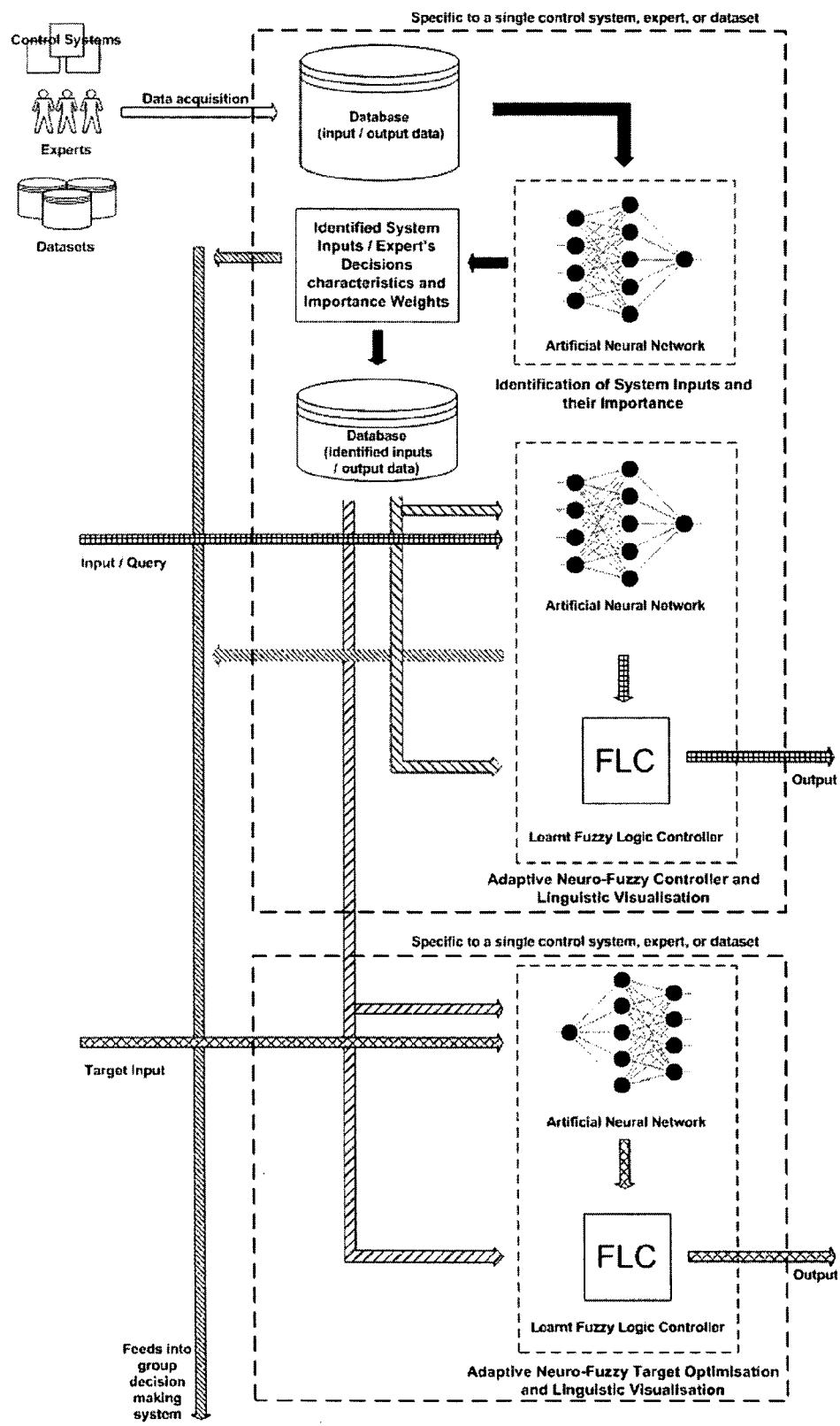
FIG. 7 is a high level flow diagram of the present invention.
Figure 7:
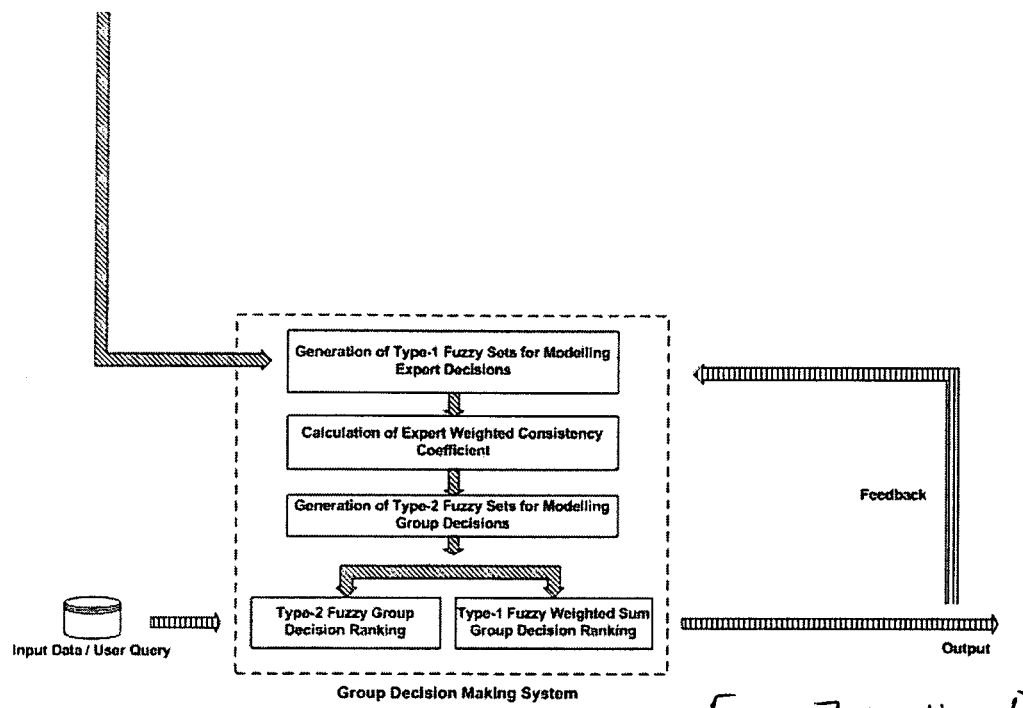
Figure 8:
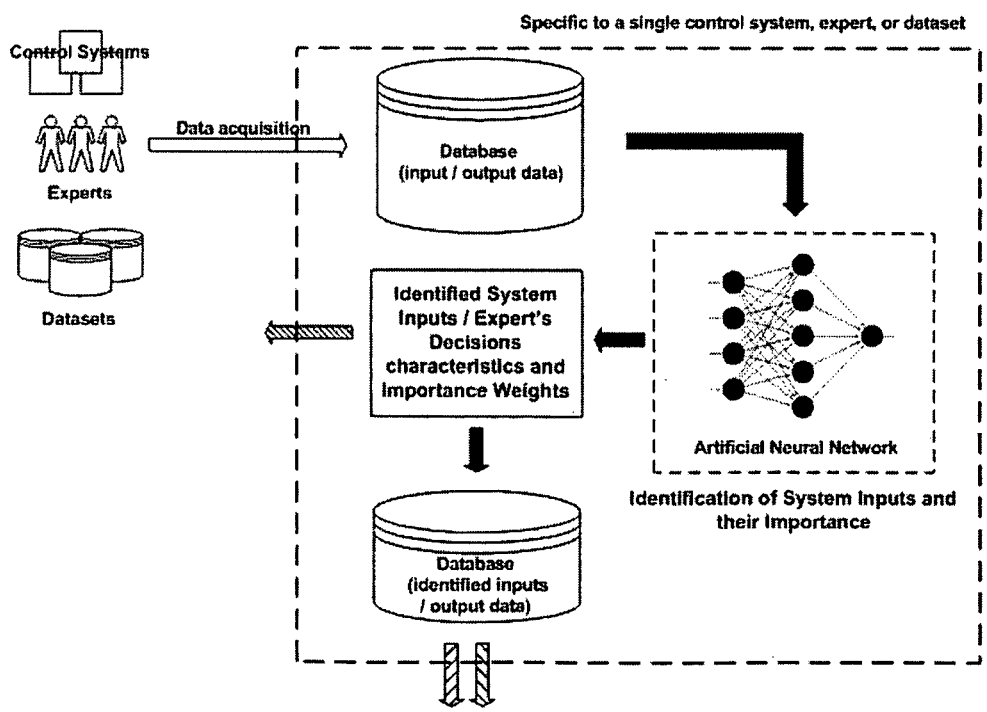
FIG. 8 is a flow diagram of the phase where the system is identifying system inputs and assigning importance thereto.

The invention high level flow diagram is shown in FIG. (7). The invention works on the historical and current data that could be available for a given application domain. The system then offers the following methods and controllers.

The system creates decision models from the different data sources such as application specific datasets, control system data, and expert opinions that captures the relationships in the data and/or collective views from a group of experts in a consistent and objective way by modelling the uncertainties between the experts' preferences and/or different data sources. The data/information can be derived from large databases, extracted from forms, other types of documents or elicited from experts. The employed data is distilled into sets of multi-input multi-output pairs: $(x^{(t)}; y^{(t)})$, t=1,2, . . . , N where N is the number of data instances, $x^{(t)} \in R^n$ and $y^{(t)} \in R^k$.

The system then identifies system inputs and assign an importance thereto. FIG. (8) shows a flow diagram of this phase. From the system available data the system identifies what are the most important inputs/features that directly influence specific and relevant output performance measures such as sales, revenue, costs, energy, or human expert's decision etc depending on the given application. In addition, the system is able to graphically show the importance of each input on the given output performance measure (i.e. identify the degree of influence and affect each input feature has on the output (the weight importance of the given important input features)) the user is interested in observing. Each given output is represented by defined number of linguistic labels (for example the profit output could be represented by linguistic labels such low, medium, high, etc). The system employs a Multilayer Preceptron feedforward backpropagation Neural Network $net_s$ for each given output decision, classification or value s that is designated by the defined linguistic labels s. This Artificial Neural Networks (ANN) model was chosen as it has been shown to be a universal approximator and thus this ANN can find the mapping from the input values to the given output values using only one hidden layer. In addition, this ANN is relatively easy to be rapidly trained. Once, trained, this ANN model can very rapidly map inputs to outputs.

The available data $d_s$ is split into two subsets: a training set $d_{s_1}$ (⅔ of $d_s$) and a testing set $d_{s_2}$ (⅓ of $d_s$). The network is trained on $d_{s_1}$ and its accuracy is estimated on $d_{s_2}$. The purpose of the testing set is to estimate the accuracy on an independent dataset (instead of the training set itself) in order to avoid over fitting the training data. The training learning curve decreases monotonically for each successive epoch, in contrast the testing learning curve decreases monotonically to a minimum at which point it start to increase as the training continues. Training beyond this minimum point is essentially learning from noise contained within the training data; thus stopping the training at this point will allow us to avoid over-fitting the training data. Therefore, we stop training the neural network is stopped at this minimum point.

The invention employs a unique adaptive ANN architecture, where the ANN is adapting the number of its hidden neurons based on the supplied data to find the best model of the system while using the least number of hidden neurons thus optimising the system performance. In addition, the ANN is trying to adaptively reduce its inputs to find the minimum set of relevant inputs (and their importance) to the given output linguistic label that will be able to give a good model of the system. The system also adapts to the change of data, addition/removals of inputs, etc. by retraining the ANN thus allowing the system to adapt to the changing conditions and always find the most relevant inputs (and their importance) to the given outputs. The neural network topology comprises of an input and output layer with single hidden layer. The number of hidden neurons H is adaptively determined by determining the neural network accuracy on $d_{s_2}$. H is initially set to 1. After training for a fixed H, the network accuracy on the testing set $d_{s_2}$ is recorded and H is incremented by 1. This continues until finding the best H by the following criterion: if H gives a best result while H+1 and H+2 do not yield a better result, then H is considered to be the best and optimum number of hidden neurons. After determining the best H the whole training set $d_s$ (to better utilize available training data) is applied to train a network with a fixed H (starting from the saved trained weight settings of the best H). After the training, the feature weighting is extracted from the trained network as follows: For an input node m its feature weight is given by:

$$r_{mks} = \sum_{b=1}^{H} |V_{ib} \times V_{bz_s}| \quad (14)$$

In the above equation, $r_{mks}$ is the feature weight for input node m; $v_{ib}$ is the network weight (link strength) from input node m to the hidden node b, and $V_{bz_s}$ is the weight from the hidden node b to the output node $z_s$; H is the number of hidden neurons. Each term in Equation (14) represents one path from an input node m to the output node $z_s$, through a hidden node b. The summation covers all possible forward paths from input node m to the output node. The rational for Equation (14) is that if a feature is important, it will have more influence on the output node by propagating forward through the hidden nodes. Such influence is reflected in the strengths of links along all the related paths. Equation (14) gives a quantified overall measure on the influence of each input attribute on the output ranking decision. The trained neural network estimates the relative importance or weight $r_{mks}$ of each input feature based on strengths (weights) of related links in the network, in which an important input feature is typically connected to strong links and has more impact on the output decision classification or value s. A more important input feature therefore receives a larger weight than less important or irrelevant characteristic. The derived weights $r_{mks}$ for the input attributes $Q_k$ are ordered and normalized. A predefined threshold value is used to eliminate irrelevant attributes to determine the subsets $Q_{ks}$ of input characteristics and their corresponding weight values $r_{eks}$ where e=1 to $Q_{ks}$. The attributes $Q_{ks}$ best characterise the linguistic ranking decision s.

Unlike other feature selection and dimensionality reduction methods the method disclosed herein provides feature extraction with weights showing the degree of influence and effect each input attribute has on the output decision; providing justification for the systems ranking decisions. In addition, the innovated ANN has many advantages over other feature weighting mechanisms that employed ANN where the innovated ANN is adaptive as is trying to adaptively reduce its inputs to find the minimum set of relevant inputs (and their importance) to the given output linguistic label that will be able to give a good model of the system. The system also adapts to the change of data, addition/removals of inputs, etc by retraining the ANN thus allowing the system to adapt to the changing conditions and always find the most relevant inputs (and their importance) to the given outputs.

FIG. (9) shows a high-level flow diagram of the controller detailed below. A neuro-fuzzy model is used to develop a controller that can predict a specific output given specific input states. The inputs to the system are based on the most influential input parameters selected from the execution of the identification of system Inputs and their importance method explained in the previous section. The models generated by the system can be used to predict how the output performance (e.g. sales, revenue, power consumption, costs etc) will be affected by a given set of circumstances reflected through specific values (such as costs, pricing, head counts, monthly inventories, consumer habits, etc), of inputs parameters. The system is able to predict the outputs based on observing similar trends from past and historical data. This can be shown to managers and end users using the data visualisation approaches that would be developed for the specific needs of the client. The developed controller can be used to automatically analyse new information and suggest accurate and non-bias outcome decisions as well as indicate the strength and justification for the recommendations.

The system employs the ANN described in the previous section which identified the most influential system inputs and their importance. There is a $net_s$ for each given output classification s that is to be predicted. This ANN could be used to predict the system output given the states of the most influential inputs to this given output. However, there is a need to employ other methods to enable the production of user friendly systems where the performance of the system and its operation could be easily understood and analysed by the user. Hence, fuzzy systems appears as an attractive option to be integrated with ANNs to combine the linguistic interpretation of fuzzy systems with the ability of ANNs to generate system models from data. Neuro-fuzzy systems refers to combinations of ANN and fuzzy logic. Neuro-fuzzy hybridization results in a hybrid intelligent system that synergizes these two techniques by combining the human-like reasoning style of fuzzy systems with the learning and connectionist structure of neural networks. Neuro-fuzzy hybridization is widely termed as Fuzzy Neural Network (FNN) or Neuro-Fuzzy System (NFS) in the literature. Neuro-fuzzy system (the more popular term is used henceforth) incorporates the human-like reasoning style of fuzzy systems through the use of fuzzy sets and a linguistic model consisting of a set of IF-THEN fuzzy rules. The main strength of neuro-fuzzy systems is that they are universal approximators with the ability to solicit interpretable IF-THEN rules. The strength of neuro-fuzzy systems involves two contradictory requirements in fuzzy modelling: interpretability versus accuracy. In practice, one of the two properties prevails. The neuro-fuzzy systems in fuzzy modelling research field is divided into two areas: linguistic fuzzy modelling that is focused on interpretability, mainly the Mamdani model; and precise fuzzy modelling that is focused on accuracy, mainly the Takagi-Sugeno-Kang (TSK) model. Although generally assumed to be the realization of a fuzzy system through connectionist networks, this term is also used to describe some other configurations including:

Deriving fuzzy rules from trained Radial Basis Function (RBF) networks.

Fuzzy logic based tuning of neural network training parameters.

Fuzzy logic criteria for increasing a network size.

Realising fuzzy membership function through clustering algorithms in unsupervised learning in SOMs and neural networks.

Representing fuzzification, fuzzy inference and defuzzification through multi-layers feed-forward connectionist networks.

It should be pointed out that interpretability of the Mamdani-type neuro-fuzzy systems can be lost. To improve the interpretability of neuro-fuzzy systems, certain measures must be taken, wherein important aspects of interpretability of neuro-fuzzy systems are also preserved. Hence, the previous work has focused in realising fuzzy system through connectionist networks where at the end of the day, the interpretability of the fuzzy systems could be lost especially if aiming to produce adaptive fuzzy systems as in Evolved Fuzzy Neural Networks (EFuNNs) which employ iterative learning which would be too cumbersome for the intelligent systems which are the subject of the present invention.

The process presented in the section below involves an innovative approach which uses the developed ANN and extracts data from it which is used to learn the parameters of a normal Fuzzy Logic System (FLS). A novel online fast one pass learning technique which operates on the data acquired from the ANN to learn in a short term interval the fuzzy rules and membership functions that are needed by the FLS is described. The developed FLS presents an interpretable user friendly system which can be easily understood and analysed by the human user. In addition, the system adapts its rules in very short interval to any change in the system parameters or data. This fast adaptation could not be achieved by any of the existing Neuro-Fuzzy systems which require time consuming iterative cycles to adapt to any change in system parameters or data. In this way is gained the benefit achieved by ANN for identifying the most important parameters and their weights combined with an adaptive FLS that can interpret the behaviour of the ANN controller and present an easy to interpret and analyse model of the system that explains its operation. The Predictive controller operates as follows: the ANN explained above employs the most influential input parameters for a given input. The ANN can predict the system output given the input parameters states. An adaptive FLC that can be tuned to approximate the learnt model of the ANN is disclosed.

The subset training data is used to construct a fuzzy logic model that explains the relation between the inputs and the outputs. The fuzzy model generates linguistic labels and linguistic If-Then rules which could be read, analysed understood by the system user. The fuzzy linguistic labels and rules are able to explain to the end users, how and why specific inputs such as: numbers of service bays used, sales of new and used cars and costs and pricing of parts, along with other demographic data on consumer habits and regional factors, have an influence on overall sales and costs to the business. These allow end users to make more informed decisions about their business or a specific application. The following technique used to extract the fuzzy model linguistic labels and rules that form an adaptive FLC.

An online fast unsupervised data-driven one-pass approach is used for extracting fuzzy rules and membership functions from the training data to learn a fuzzy controller that explains the relation between the selected inputs and the outputs. The training data consists of the most influential input parameters and desired or observed data outputs as predicted by the ANN. The data can be formally described as a set of multi-input multi-output data pairs:

$$(x^{(t)}; y^{(t)}), t=1,2,\ldots,N \qquad (15)$$

where N is the number of data instances, $x^{(t)} \in R^n$ and $y^{(t)} \in R^k$. The technique will extracts rules which describe how the k output variables $y=(y_1,\ldots,y_k)$ are influenced by the n input variables $x=(x_1,\ldots,x_n)^T \in R^n$ based on the sampled data.

The learnt FLC provides an inference mechanism that produces output control responses based on the current state of the inputs. The adaptive FLC also allows the rules to be adapted and extended online facilitating more accurate approximation of the data and user queries, the ability to handle data as they change over time and the ability for the FLC rules to be overridden by the user or other system component. The technique outlined below extracts fuzzy membership functions and fuzzy rules to create a FLC from the recorded data. The FLC is adaptive and online using a life long learning and adaptation mechanism. The adaptive FLC is a control loop that once initiated receives inputs that produce appropriate output control responses based on the set of learnt rules or cause the learnt rules to be adapted before an appropriate output control response is produced.

The accumulated input/output data from the ANN is categorised into a set of fuzzy membership functions of type-1 or type-2, which quantify the raw crisp values of the inputs and outputs into linguistic labels such as normal, high or low. This is a simple and effective approach to fuzzy information granulation where the objective is to build models at a certain level of information granulation that can be quantified in terms of fuzzy sets.

The dataset contains r input/output attributes $j=1,2,\ldots,r$ and $K_j$ fuzzy sets are defined on each dimension where $z=1, 2,\ldots,K_j$. These fuzzy sets are distributed over the range of values of each parameter. The fuzzy sets at the boundaries are modified such that they are extended indefinitely beyond their respective centres with a membership value of 1. A semantic meaning can be associated with each of the resulting fuzzy sets. Specifically depending on the value of index z, a meaningful symbolic label can be given to $A_z^j$. There are different data driven approaches, which can be employed for generating both type-1 or type-2 membership functions for representing the fuzzy sets. Two of these methods are developed by the inventors and described in IEEE Transactions on System, Man and Cybernetics 35, 55-65 (2005) and IEEE Transactions on fuzzy Systems 15(1), 41-55, (2007).

The defined set of membership functions are combined with the input/output data to extract the rules defining the user's behaviours. The fuzzy rule extraction is a one pass technique for extracting fuzzy rules from the sampled data. The fuzzy sets for the antecedents and consequents of the rules divides the input and output space into fuzzy regions.

Multi-input multi-output rules are extracted which describe the relationship between the data outputs $y=(y_1, \ldots, y_k)$ and the data inputs $x=(x_1, \ldots, x_n)^T$, and take the following form:

$$\text{IF } x_1 \text{ is } A_1^{(l)} \text{ and } \ldots \text{ and } x_n \text{ is } A_n^{(l)}, \text{ THEN } y_1 \text{ is } B_1^{(l)} \text{ and } \ldots \text{ and } y_k \text{ is } B_k^{(l)} \quad (16)$$

$l=1,2,\ldots,M$, where M is the number of rules and l is the index of the rules. There are V fuzzy sets $A_s^q$, $q=1, \ldots, V$, defined for each input $x_s$. There are W fuzzy sets $B_c^h$, $h=1, \ldots, W$, defined for each output $y_c$. The approach extracts rules in the form of Equation (16) from the data.

1) Process Of Extracting Fuzzy Rules From Data: To simplify the following notation, the method for rules with a single output is shown, as the approach is readily expanded to rules with multiple outputs. In the following steps are shown the different steps involved in rule extraction:

Step 1: For a fixed input-output pair $(x^{(t)}; y^{(t)})$ in the dataset (1) ($t=1,2,\ldots,N$), compute the membership values $\mu_{A_s^q}(x_s^{(t)})$ for each membership function $q=1,\ldots,V$, and for each input variable s ($s=1,\ldots,n$), find $q^* \in \{1,\ldots,V\}$, such that $$\mu_{A_s^{q^*}}(x_s^{(t)}) \geq \mu_{A_s^q}(x_s^{(t)}) \quad (17)$$

for all $q=1,\ldots,V$.

Let the following rule be called the rule generated by $(x^{(t)}; y^{(t)})$:

$$\text{IF } x_1^t \text{ is } A_1^{q^*} \text{ and } \ldots \text{ and } x_n^t \text{ is } A_n^{q^*}, \text{ THEN } y \text{ is centred at } y^{(t)} \quad (18)$$

For each input variable $x_s$ there are V fuzzy sets $A_s^q$, $q=1,\ldots,V$, to characterise it; so that the maximum number of possible rules that can be generated is $V^n$. However given the dataset only those rules among the $V^n$ possibilities whose dominant region contains at least one data point will be generated. In step 1 one rule is generated for each input-output data pair, where for each input the fuzzy set that achieves the maximum membership value at the data point is selected as the one in the IF part of the rule, as explained in Equations (17),(18).

This however is not the final rule which is calculated in the next step. The weight of the rule is computed as $$w^{(t)} = \prod_{s=1}^{n} \mu_{A_s^q}(x_s(t)) \quad (19)$$

The weight of a rule $w^{(t)}$ is a measure of the strength of the points $x^{(t)}$ belonging to the fuzzy region covered by the rule.

Step 2: Step 1 is repeated for all the t data points from 1 to N to obtain N data generated rules in the form of Equation (18). Due to the fact that the number of data points is quite large, many rules are generated in step 1, that all share the same IF part and are conflicting, i.e. rules with the same antecedent membership functions and different consequent values. In this step, rules with the same IF part are combined into a single rule.

The N rules are therefore divided into groups, with rules in each group sharing the same IF part. If we assume that there is M such groups. Let group l have $N_l$ rules in the following form:

$$\text{IF } x_1 \text{ is } A_1^{(q_u^l)} \text{ and } \ldots \text{ and } x_n \text{ is } A_n^{(q_u^l)}, \text{ THEN } y \text{ is centred at } y^{(t_u^l)} \quad (20)$$

Where $u=1,\ldots N_l$ and $t_u^l$ is the index for the data points in group l. The weighted average of all the rules in the conflict group is then computed as $$av^{(l)} = \frac{\sum_{u=1}^{N_l} y^{(t_u^l)} w^{(t_u^l)}}{\sum_{u=1}^{N_l} w^{(t_u^l)}} \quad (21)$$

These $N_l$ rules are combined into a single rule of the following form:

$$\text{IF } x_1 \text{ is } A^{(l)} \text{ and } \ldots \text{ and } x_n \text{ is } A_n^{(l)}, \text{ THEN } y \text{ is } B^{(l)} \quad (22)$$

Where the output fuzzy set $B^l$ is chosen based on the following. Among the W output fuzzy sets $B^1, \ldots, B^W$ find the $B^{h^*}$ such that $$\mu_{B^{h^*}}(av^{(l)}) \leq \mu_{B^h}(av^{(l)}) \quad (23)$$

for $h=1,2,\ldots,W$, B is chosen as $B^{h^*}$.

As mentioned above the technique deals with input-output data pairs with multiple outputs. Step 1 is independent of the number of outputs for each rule.

Step 2 is simply expanded to allow rules to have multiple outputs where the calculations in Equations (21) and (23) are repeated for each output value. Once the membership functions and the set of rules have been extracted from the input/output data, the FLC has been formed. The learnt FLC can be used to provide output control responses to users based on different input conditions or end user queries.

The FLC learnt from the training data may need to be adjusted and tuned to better approximate the behaviour of the neural network data outputs for specific sets of input conditions. and/or user queries. The FLC should also be adaptive to handle input data as it changes over time, and also allow the user or another system component (such as the neural network) to change the FLC rules to model the correct output responses for specific inputs if it is necessary to do so. The system adapts its rules online or add new rules to approximate the changes in the system input parameters or conditions.

Whenever the input conditions change, a snapshot of the state of the current inputs is recorded and passed to the rule adaptation routine. Each input parameter in the input vector x is compared to each of the antecedent sets $A_s^{(l)}$ of a given rule in the rule base to determine its membership value. The weight of the rule is then calculated to determine if the product of the input membership function (degree of firing of the rule) in Equation (19) $w^{(l)} > 0$, meaning that the rule fired, and would therefore have contributed to the overall control response generated by the FLC. The consequent membership functions that give the highest membership values to the overriding output values are selected to replace the consequent sets of all fired rules in the rule base.

$$\mu_{B_c^{h^*}}(y_c) \geq \mu_{B_c^h}(y_c) \quad (24)$$

for $h=1,2,\ldots,W$. The $B_c$ is chosen as $B_c^{h^*}$. Where $c=1, 2\ldots,k$.

The fired rules are therefore adapted to better reflect the updated system responses given the current state of the environment. If none of the existing rules fired, new rules are added based on forming rules from the input fuzzy sets. For each input parameter $x_s$ the fuzzy sets that give a membership value where $$\mu_{A_s^q}(x_s^{(t')}) > 0$$

are identified. This leads to a grid of identified fuzzy set(s) for each input parameter. From this grid new rules are constructed based on each unique combination of consecutive input fuzzy sets. The consequent fuzzy sets for each of the new rules are determined using Equation (24). This allows new rules to be gradually added to the rule base. The system will also add new rules when the input state is undefined by the existing rules in the rule base; i.e. none of the existing rules fired. In this case the approach creates new rules where the antecedent sets reflect the current input states and the consequent fuzzy sets are based on the current state of the outputs.

The system adopts life long learning where it adapts its rules as the state of the inputs change over a period of time. Due to the flexibility of the system the initially learnt FLC can be easily extended to change both existing rules as well as add new rules. The fuzzy nature of the rules permits them to capture a wide range of values for each input and output parameter. This allows the rules to continue to operate even if there is a gradual change in the information being processed. If however there is a significant change in the data, which is no longer captured by the existing rules, then as mentioned previously the system will automatically create new rules that satisfy the current conditions. The system will therefore incrementally extend its behaviours which can then be adapted to satisfy the information being processed and the end user's needs.

Thus the controller reported above allows the system to predict the system output given the input states and show the relationship between the identified inputs and outputs in user friendly format by employing fuzzy linguistic labels and rules. The models generated by the system can be used to show a given end user how the specific inputs (like costs, pricing, head counts, monthly inventories and consumer habits, regional factors), are having a direct influence on outputs (like revenue and costs). This allows end users to make more informed decisions about their business.

The system is also identify how the various output can affect other outputs of the system by having given outputs as extra inputs to the given ANN besides the input parameters and thus the system might be able to report how the given outputs are interrelated.

FIG. (10) shows a high level overview of the optimisation method. A neuro-fuzzy model is used to develop an optimiser that can find the optimal input values to reach a given target output. The models generated by the system can be used to show how a specific output performance target can be achieved by finding the optimum values of the business inputs (e.g. costs, pricing, head counts, monthly inventories and consumer habits, regional factors), that will achieve this target.

For instance the system can determine how certain performance targets, i.e. achieving a 30% reduction in the cost of parts, can be achieved and show to the users exactly what are the optimum business inputs required to achieve this reduction. The system is able to show this based on observing similar trends and relationships from past and historical data. Thus the system user is able to query the system to say for example, "if I want to increase my profits from 20% to 50% what optimum inputs values will allow me to affect this rise in profits and how".

The most influential input parameters derived from the identification of system Inputs and their importance process method, are defined as multiple outputs to the optimisation method. The input(s) to the method represent the target(s) that need to be optimised. Training data for the optimisation method is therefore a multi-input, multi-output dataset and is used to train a multilayer feedforward backpropagation Neural Network $net_s$ for the specific target(s). The training data $d_s$ is split into two subsets: a training set $d_{s_1}$ (⅔ of $d_s$) and a testing set $d_{s_2}$ (⅓ of $d_s$). The network is trained on $d_{s_1}$ and its accuracy is estimated on $d_{s_2}$. The purpose of the testing set is to estimate the accuracy on an independent dataset (instead of the training set itself) in order to avoid over fitting the training.

Figure 9:
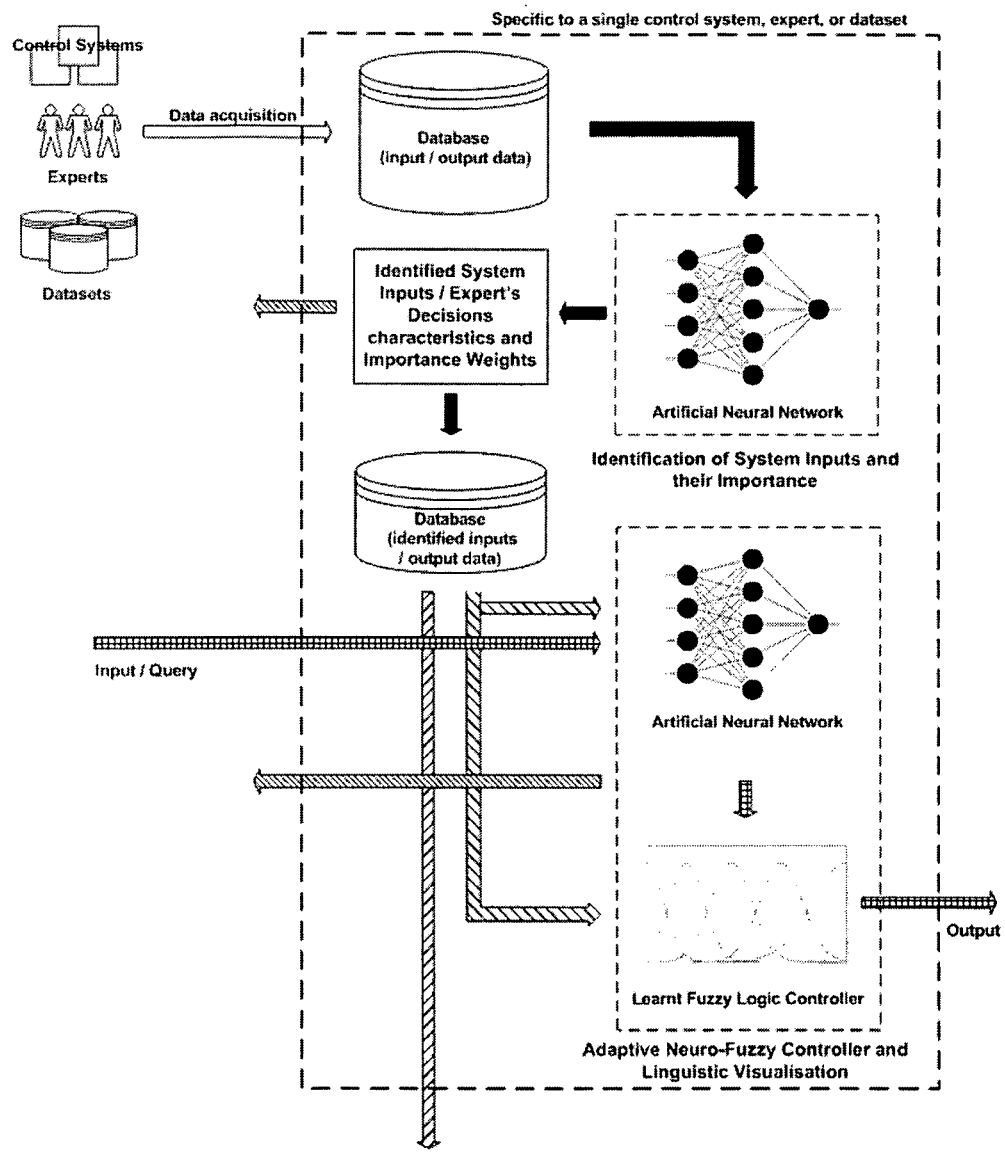
FIG. 9 is a flow diagram illustrating extracting fuzzy rules together with membership functions from the training data described in the predictive controller process component.
Figure 10:
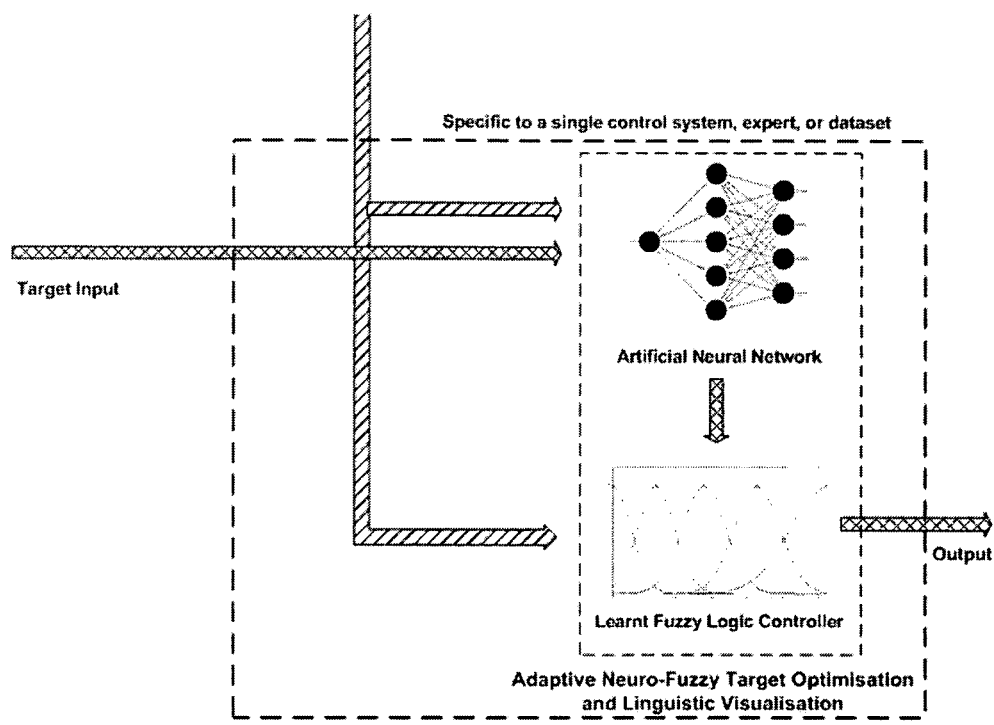
FIG. 10 is a flow diagram illustrating a high level overview of the optimisation.
Figure 11:
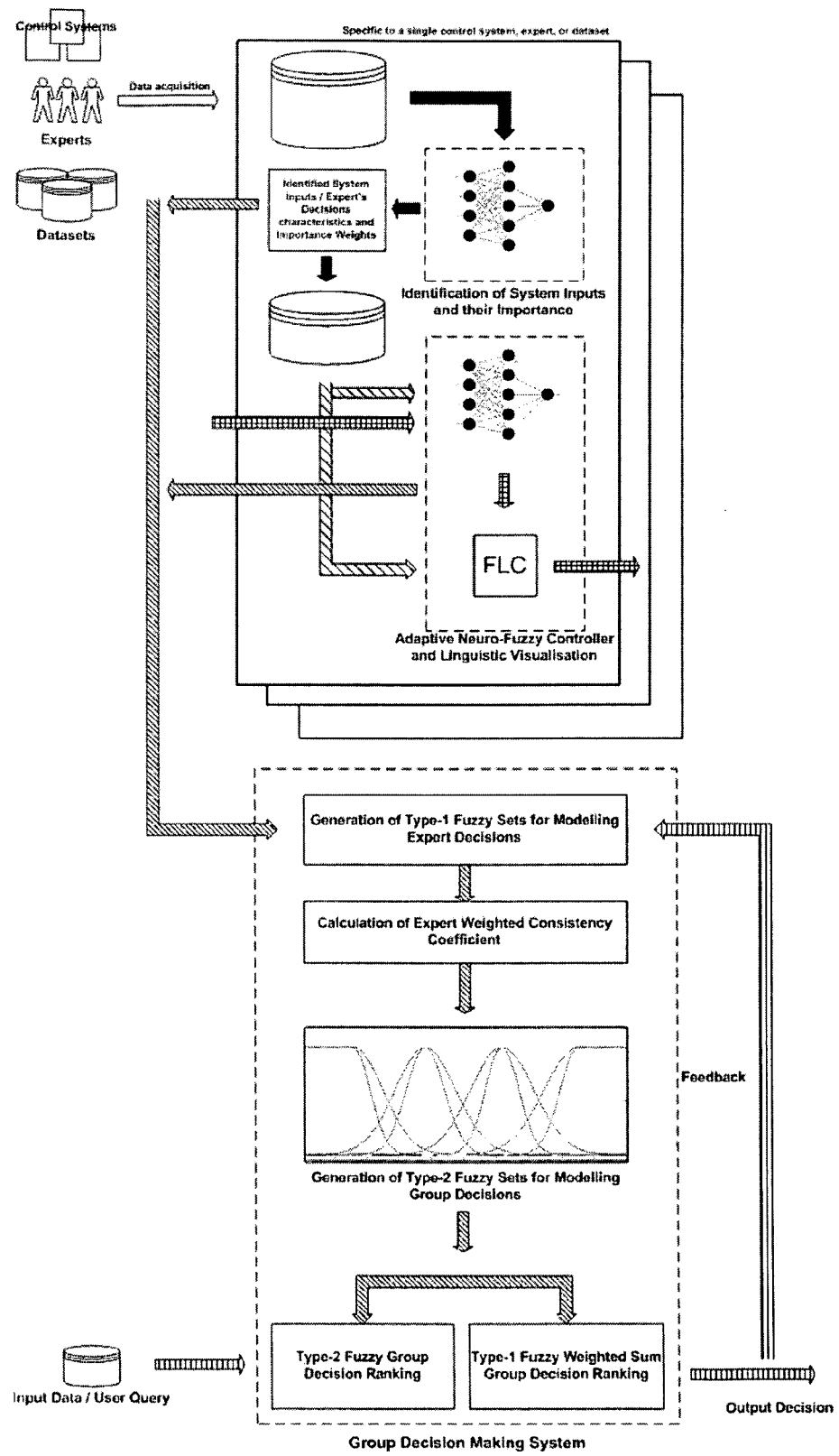
FIG. 11 is a flow diagram illustrating a high level overview on the group decision making process.

Into the trained network is combined the adaptive FLC, which is then tuned and approximated to the behavior of the ANN in order to represent the networks behaviour using the FLC's linguistic rules. A FLC is generated from the training data using the unsupervised data-driven one-pass approach (explained in the previous section) for extracting fuzzy rules together with membership functions from the training data described in the predictive controller process component (described in FIG. 9) to explain the operation of the optimizer and to explain in a human friendly interpretable manner how the optimum input values will help to achieve a given target.

FIG. (11) shows a high level overview on the group decision making process reported in this section. In this component, the invention provides a method that enables integration of the various data sources such as datasets, control system behavior and experts opinions to determine best practice and analysis approaches. This can create a group decision making process allowing the integration of the various data sources and or expert opinions. This can be used to highlight the performance successes and bottlenecks across the whole application domain. The system can use this information to generate best practices. This will add a unique feature of being able to integrate distributed data sources or human expert opinions using a novel consensus modeling and decision making framework. Thus the method developed in this phase will be able to aggregate data from different experts to provide a performance overview.

1) Generation of Type-1 Fuzzy Sets for Modelling Expert, Data or Control Decisions: Type-1 fuzzy sets are used for modelling the uncertainties and varying consistencies between the experts' preferences or attributes pertaining to different data sources. For each expert or data source $E_k$ a set of weighted characteristics or input attributes $Q_{ks}$ are elicited from a loaded dataset. In the case of a data source such as a dataset or control system behaviour the data would comprise of input/output pairs. In the case of an expert this data would comprise of instances of inputs for which the expert's decisions would be observed over time. The Identification of system Inputs and their importance process component; is used to derive the set of weighted characteristics or input attributes $Q_{ks}$ that identify the most important input attributes and their weights that characterise the expert's output decisions or the output classification or behaviour of a dataset or control system.

Figure 12:
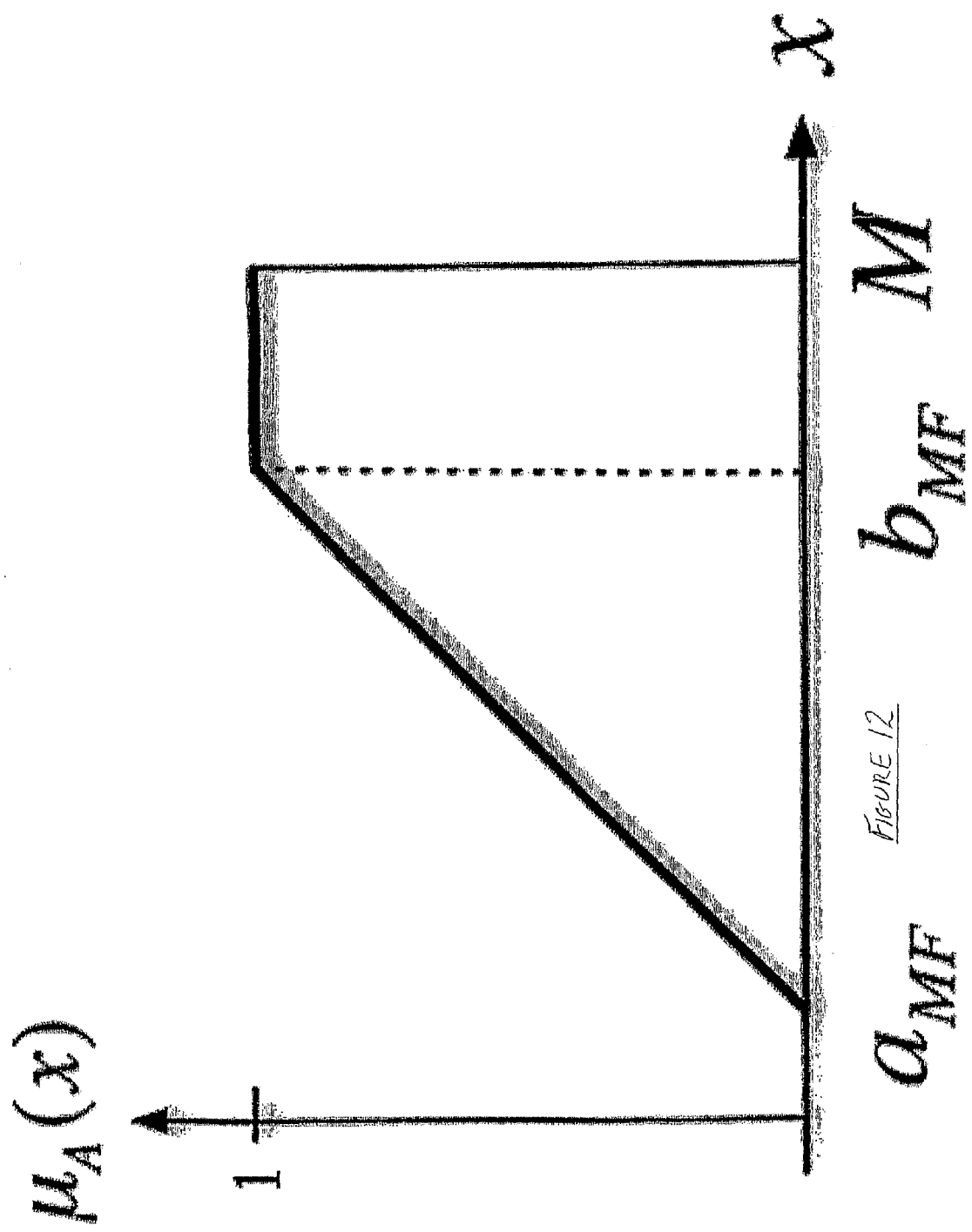
FIG. 12 illustrates right shoulder MFs.

A set of linguistic labels s represents each expert's decisions or data source output classification or value. For each expert or data source $E_k$ the set of weighted characteristics $Q_{ks}$ selected for the linguistic decision labels is used to generate the parameters for MFs representing the fuzzy sets associated with the linguistic labels. More formally $A_s^k$ is a type-1 fuzzy set associated with the linguistic label s for each expert or data source $E_k$, that is used to define their output decisions, classifications or values. The shapes of the membership functions for each fuzzy set could be of any shape (for example right shoulder MFs as shown in FIG. 12.) The parameters $[a_{MF}, b_{MF}]$ denote the left and right defining points of the support of a MF, as shown in FIG. 12. The parameters $[a_{MF_{(s)}}^k, b_{MF_{(s)}}^k]$ for each MF are derived directly from the weight values of the selected requirement characteristics $Q_{ks}$ for expert or data source $E_k$ and are calculated as set out below:

The generated type-1 fuzzy sets can model the selected attributes from the expert's preferences that best characterise their decisions or the dataset or control system attributes that best characterise their output classification or output responses. The type-1 fuzzy sets are used to derive the consistency of each expert's decision making behaviour or the consistency of the sample dataset or controller behaviour with respect to their outputs classifications or values.

2) Calculation of Expert, Data Source Weighted Consistency Coefficient: a weighted consistency coefficient of each expert's decision-making behaviour, data output classifications or controller outputs is determined by recording a sample set of T test data instances for which the expert's decision, or a dataset or system's outputs are observed or recorded. The test sample set of T data instances for which the expert's decision or data source outputs have been observed, are then mapped onto the fuzzy sets modelling the expert's decisions, data classifications or system outputs.

For a given expert or data source $E_k$ the matching attribute characteristics $W_{jk}$ for each data instance j are compared against the attributes $Q_{ks}$ defining each fuzzy set $A_s^k$. For each $Q_{ks}$ the given data instance attributes $c_{xjk}$ which match $c_{eks}$ are denoted as $c_{gjks}$ where $c_{gjks}=c_{xjk}=c_{eks}$ and g=1 to $W_{jks}$ where $w_{jks}$ is the number of attributes matching those in $Q_{ks}$. The rating values $r_{gjks}$ of all the attributes in $W_{jks}$ are then aggregated together to determine numerical ranking scores for the data instance computed as follows:

$$Agr_{ks} = \Sum_{g=1}^{W_{jks}} r_{gjks} \tag{25}$$

where the ranking score $Agr_{ks}$ pertains to one of a number of ranking decisions s. Each $Agr_{ks}$ is mapped onto the corresponding fuzzy set $A_s^k$ to determine a fuzzy membership value that shows the degree to which the data instance satisfies the ranking decision criteria. The fuzzy set with the highest membership is selected for ranking the data instance as follows:

$$\mu_{A_{q^*}^k}(Agr_{kq^*}) \geq \mu_{A_s^k}(Agr_{ks}) \tag{26}$$

where $q^* \in \{1, \ldots s\}$.

The consistency coefficient for each expert or data source is calculated by comparing the ranking decisions determined from the fuzzy sets with the recorded test dataset T of the observed expert's decisions or observed outputs of the dataset or behaviour of the controller outputs. The number of training data instances $T_k$ where both the system's and expert's ranking decisions are the same is divided by the total number of data instances T to give the expert's or data source's consistency coefficient $Con_k$. The average of the consistency coefficients for each expert or data source is calculated as follows:

$$AvgCon = \frac{\sum_{k=1}^{R} Con_k}{R} \tag{27}$$

A weighting factor is calculated from the consistency coefficients for each expert or data source and the average consistency coefficient as follows:

$$Wf = \max\left(\frac{Con_k}{AvgCon}\right) \tag{28}$$

Finally a weighted consistency coefficient for each expert's decision making behaviour or data source behaviour is calculated as follows:

$$WCon_k = \left(\frac{Con_k}{Wf}\right) \tag{29}$$

The most consistent experts or data sources are given a higher weighted consistency coefficient than those whose decision making behaviour was observed to be least consistent. Experts or data sources who fall below a specific consistency threshold are be eliminated from the group decision-making process at this stage.

3) Generation of Type-2 Fuzzy Sets for Modeling Group Decisions: The weighted consistency coefficients $WCon_k$ for each expert's decision making behaviour or data source behaviour are used to create the footprint of uncertainty for Interval type-2 fuzzy sets associated with the linguistic labels representing the output decisions, classifications or values s More formally $\overline{A}_s$ is an interval type-2 fuzzy set associated with the linguistic label s. In the system the shapes of the membership functions for each fuzzy set are based on right shoulder upper and lower MFs as shown in FIG. 13. The parameters $[a_{MF}, b_{MF}]$ denote the left and right defining points support for the lower MF and the parameters $[\overline{a}_{MF}, \overline{b}_{MF}]$ denote the left and right defining points of support for the upper MF, see FIG. 13. The MF parameters $[\underline{a}_{MF_{(s)}}, \underline{b}_{MF_{(s)}}, \overline{a}_{MF_{(s)}}, \overline{b}_{MF_{(s)}}]$ for each type-2 fuzzy set $\overline{A}_s$ are calculated as follows:

$$\underline{a}_{MF_{(s)}} = \min(a) \tag{30}$$

$$\underline{b}_{MF_{(s)}} = scFact \tag{31}$$

$$\overline{a}_{MF_{(s)}} = \max(a) \tag{32}$$

$$\overline{b}_{MF_{(s)}} = \left(\frac{1.0}{\tan\left(\frac{\min(WCon_k)}{scFact}\right)}\right) \times 1.0 \tag{33}$$

where tan is the tangent, and scFact is an arbitrary scaling factor such as 100 over which the membership values and ranking scores are scaled.

The approach above describes one method for generating the type-2 fuzzy, a second approach to achieve this is as follows:

The type-1 fuzzy sets that are generated for each expert's decision preferences or for modelling the input attributes for specific outputs for each data source $E_k$ in part 2, are aggregated to create the FOUs for Interval type-2 fuzzy sets. Using the Representation Theorem, each Interval type-2 Fuzzy set $\tilde{A}_s$ is computed as:

$$\tilde{A}_s = \bigcup_{k=1}^{R} A_s^k \tag{33}$$

Where $A_s^k$ is referred to as the $k^{th}$ embedded type-1 fuzzy set and $\cup$ is the union operation. The process of generating $\tilde{A}_s$ is based on approximating the upper MF ($\bar{\mu}_{\tilde{A}_s}(x)$) and the lower MF ($\underline{\mu}_{\tilde{A}_s}(x)$) of $\tilde{A}_s$. This depends on shape of the embedded type-1 fuzzy sets and the FOU model which is to be generated for $\tilde{A}_s$. The type-2 fuzzy set footprint of uncertainty defined for each decision is a direct measure of the uncertainty in the varying consistencies from the group of experts or data sources, and take into account the impact each experts judgments or data reliability have on the final group decision. The FOUs of the type-2 sets can also be derived from the varying selected preferences or attributes of different experts or data sources, etc The system can now rank new data and information based on the fuzzy group decision model derived from the experts or data sources. There are two approaches used for deriving these group decision making and ranking models:

4a) Type-2 Fuzzy Group Decision Ranking: attributes are first extracted from the new data instances and compared against the rated attributes characterising each expert's ranking decisions. The data instances are scored based on the procedure outlined above to derive the aggregated ranking scores $Agr_{ks}$ pertaining to each of the output decisions, classifications or control outputs s. The aggregated ranking scores $Agr_{ks}$ of a new data instance are scaled using the weight values of the selected requirement characteristics $Q_{ks}$ for expert or data source $E_k$ and are calculated as follows:

$$ScAgr_{ks} = \left( \frac{Agr_{ks} - \min(r_{eks})}{\sum_{e=1}^{Q_{ks}} r_{eks} - \min(r_{eks})} \right) \times scFact \quad (34)$$

$r_{eks}$ represents the minimum requirements for a given characteristics for a given expert. The scaled aggregated scores reflect the degree to which the data instance satisfies the selected attributes from an expert k's preferences or data source k's selected input attributes that best characterise their output decisions, classifications or control outputs where $ScAgr_{ks}$ pertains to one of the set of ranking decisions s. The scaled scores for ranking decision are then averaged over the total number of experts as follows:

$$AvgScAgr_s = \left( \frac{\sum_{k=1}^{R} ScAgr_{ks}}{R} \right) \quad (38)$$

The average scaled scores therefore take into account the uncertainties in preferences or attributes for a given output decision, classification or control output s over the group of experts or data sources R. Each $AvgScAgr_s$ is mapped onto the corresponding type-2 fuzzy set $\overline{A}_s$ to determine a fuzzy membership value that shows the degree to which the data instance satisfies the criteria for each output decision, classification or control output while taking into account the decision making consistency of the group of experts or data sources. The type-2 fuzzy set with the highest membership is selected for ranking the new data as follows:

$$\mu \overline{A}_{q^*}(AvgScAgr_{q^*}) \leq \mu \overline{A}_s(AvgScAgr_s) \quad (39)$$

where $q^* \in \{1, \ldots s\}$.

The type-2 fuzzy sets provide a methodology for representing the outputs decisions, classifications or control responses for new information in terms of linguistic labels that are easily understandable by the human user. The scoring scheme provides a transparent breakdown of how each attribute characteristic is rated by the group of domain experts or automatically for different data sources. This can be used to provide justification for the systems selection and ranking decisions.

4b): Type-1 Fuzzy Weighted Sum Group Ranking Decision: The system can rank new data instances based on a type-1 fuzzy group decision model derived from the experts or data sources. Attributes from the data instances are compared against the rated attributes characterising each expert's outputs decisions, classifications or control responses. The data is scored based on the procedure outlined above to derive the aggregated ranking scores $Agr_{ks}$ pertaining to each of the output decisions s.

The membership functions of the fuzzy sets $A_s^k$ pertaining to each expert or data source are weighted according to the expert's or data sources consistency coefficient as follows:

$$\mu_{A_s^{kw}}(x) = \mu_{A_s^k}(x) \times WCon_k \quad (40)$$

This influences the impact the expert's judgment or data source reliability has in the final group decision. The most consistent experts or data sources will be given a higher weighting in making decisions on the data than those whose decision making behaviour or reliability was least consistent. The final group ranking decision for the data is derived as follows: the fuzzy membership values from mapping the aggregated ranking scores $Agr_{ks}$ to their corresponding fuzzy set $A_s^k$ are calculated for each expert or data source. A weighted sum of the fuzzy memberships to $A_s^k$ for all the experts or data sources is then calculated as follows:

$$\mu_{A_s^{WAvg}}(x) = \frac{\sum_{k=1}^{R} \mu_{A_s^{kw}}(Agr_{ks})}{\sum_{k=1}^{R} WCon_k} \quad (41)$$

The fuzzy set with the highest weighted sum membership is selected for ranking the data as follows:

$$\mu_{A_{q^*}^{WAvg}}(x_{q^*}) \leq \mu_{A_s^{WAvg}}(x_s) \quad (42)$$

The type-1 fuzzy sets provide a methodology for representing the ranking decisions for the new data in terms of linguistic labels that are easily understandable by the human user. The scoring scheme provides a transparent breakdown of how each attribute characteristic in the data is weighted by the group of domain experts or data sources. This can be used to provide justification for the systems selection and final decisions.

The system is designed to be adaptive by allowing the decision modelling phase to be repeated over time as experts' preferences or data sources change or new experts or data sources are added to the system. This allows a progressive improvement of the systems ability to embed richer domain knowledge based on the different opinions, preferences and decision making behaviour of domain experts or the different sets of data sources, input attributes and their outputs. The transparency of the system allows its ranking decisions to be evaluated either automatically or interactively by end users. Recommendations can be fed back into the system to adjust its internal fuzzy decision models in order to improve ranking accuracy in the future.

The invention claimed is:

1. A method of decision-making, comprising:
   inputting data from a plurality of first data sources into a first data bank;

analyzing said input data by means of a first adaptive artificial neural network, said first artificial neural network comprising a plurality of layers having at least an input layer, at least one hidden layer, and an output layer, wherein each of said layers comprises a plurality of interconnected neurons, and wherein the number of neurons in said hidden layer which are utilized, is adaptive;

determining the most important of said input data with said first artificial neural network, and defining therefrom a second artificial neural network;

deriving from said second artificial neural network a plurality of Type-1 fuzzy sets for each of said plurality of first data sources which represent the data source, combining the Type-1 fuzzy sets to create a footprint of uncertainty for type-2 fuzzy sets;

modeling a group decision;

inputting data from a second data source, and assigning an aggregate score thereto;

comparing said assigned aggregate score with a fuzzy set representing said group decision; and producing a decision therefrom.

2. The method according to claim 1, wherein:
the internal consistency of data from said first data source is determined.

3. The method according to claim 1, wherein:
the consistency of data from said first data source is compared with the consistencies of other first data sources.

4. The method according to claim 2, wherein:
a weighting value is assigned to said internal consistency.

5. The method according to claim 4, wherein:
a first data source having a weighting value outside a preset range is discounted from further calculations.

6. The method according to claim 4, wherein:
further data from a first source is input, the consistency value for said source being recalculated.

7. The method according to claim 6, wherein:
should the recalculated consistency weighting value lie inside a preset range, said first data source is incorporated in further calculations.

8. The method according to claim 1, wherein:
said first data source is a human expert in the field of the particular decision.

9. The method according to claim 1, further comprising the step of:
identifying the dominant factors affecting an outcome, assigning a weighting function to said dominant factors such that the decision produced is based on said dominant factors to a greater degree than those not so identified.

10. The method according to claim 9, wherein:
those factors having a weighing value below an outside preset value range are discounted from the decision making.

11. The method according to claim 1, further comprising the step of:
allowing a desired decision to be entered, the method then determining required input data to achieve said decision.

12. The method according to claim 1, wherein:
said second artificial neural network is used in combination with a generated adaptive Fuzzy Logic System employing a plurality of Type-1 fuzzy sets for each of said first data sources representing the data source, together forming a neuro-fuzzy model used to develop a predictive controller that can predict a specific output given specific input states.

13. The method according to claim 8, wherein:
said inputs to the system are based on the dominant input factors selected from the input data.

14. The method according to claim 1, wherein:
a third adaptive neural network is used in combination with a generated adaptive fuzzy logic system using a plurality of Type-1 fuzzy sets for each of said first data sources to represent the data source, said fuzzy logic system and Type-1 fuzzy sets together forming a neuro-fuzzy model used to develop an optimizer enabled to find the optimal input values to reach a given target output.

15. The method employing a developed adaptive neural network, according to claim 1, comprising the further step of:
extracting data from said artificial neural network which is used to learn the parameters of a normal Fuzzy Logic System.

* * * * *